(12) United States Patent
Wang et al.

(10) Patent No.: US 11,792,797 B2
(45) Date of Patent: Oct. 17, 2023

(54) INDICATING CANCELATION OF TRANSMISSIONS OF SIDELINK MESSAGES

(71) Applicant: QUALCOMM Incorporated, San Diego, CA (US)

(72) Inventors: Xiaojie Wang, Hillsborough, NJ (US); Sony Akkarakaran, Poway, CA (US); Hua Wang, Basking Ridge, NJ (US); Jing Sun, San Diego, CA (US); Juan Montojo, San Diego, CA (US); Junyi Li, Franklin Park, NJ (US); Xiaoxia Zhang, San Diego, CA (US); Tao Luo, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/184,055

(22) Filed: Feb. 24, 2021

(65) Prior Publication Data
US 2022/0272679 A1 Aug. 25, 2022

(51) Int. Cl.
*H04W 28/26* (2009.01)
*H04W 72/20* (2023.01)
*H04W 72/0446* (2023.01)

(52) U.S. Cl.
CPC ........... *H04W 72/20* (2023.01); *H04W 28/26* (2013.01); *H04W 72/0446* (2013.01)

(58) Field of Classification Search
CPC ............. H04W 28/26; H04W 72/0446; H04W 72/0406
See application file for complete search history.

(56) References Cited

U.S. PATENT DOCUMENTS

2021/0112505 A1* 4/2021 Li ........................... H04W 4/40
2022/0174682 A1* 6/2022 Li ........................ H04W 72/10

OTHER PUBLICATIONS

Ericsson: "Discussion on V2X PC5 Scheduling, Resource Pools and Resource Patterns", Draft, 3GPP TSG RAN WG1 Meeting #84bis, R1-162833, 3rd Generation Partnership Project (3GPP), Mobile Competence Centre, 650, Route Des Lucioles, F-06921 Sophia-Antipolis Cedex, vol. RAN WG1, No. Busan, South Korea, Apr. 11, 2016-Apr. 15, 2016, Apr. 1, 2016 (Apr. 1, 2016), XP051079716, 8 Pages, Retrieved from the Internet: URL: http://www.3gpp.org/ftp/tsg_ran/WG1_RL1/TSGR1_84b/Docs/ [Retrieved on Apr. 1, 2016] Paragraph [0003].

(Continued)

*Primary Examiner* — Jason E Mattis
*Assistant Examiner* — Bao G Nguyen
(74) *Attorney, Agent, or Firm* — Procopio, Cory, Hargreaves & Savitch LLP

(57) ABSTRACT

Apparatus, methods, and computer-readable media for facilitating indicating cancelation of transmissions of sidelink messages are disclosed herein. An example method for wireless communication at a sidelink device includes transmitting SCI reserving a set of resources for one or more retransmissions of a message, the set of resources identifying one or more reserved resources in a time domain. The example method also includes identifying a skipped transmission associated with one or more of the set of resources reserved by the sidelink device. Additionally, the example method includes transmitting a cancelation indication indicating the skipped transmission, the cancelation indication indicating that the skipped transmission corresponds to a previous reserved resource in the time domain, a current reserved resource in the time domain, or a future reserved resource in the time domain.

29 Claims, 13 Drawing Sheets

(56) References Cited

OTHER PUBLICATIONS

Ericsson: "Resource Allocation for Mode-2 Transmissions", Draft, 3GPP TSG-RAN WG1 Meeting #97, R1-1907136, 3rd Generation Partnership Project (3GPP), Mobile Competence Centre, 650, Route Des Lucioles, F-06921 Sophia-Antipolis, vol. RAN WGI, No. Reno, US, May 13, 2019-May 17, 2019, May 13, 2019 (May 13, 2019), XP051728582, 18 Pages, Retrieved from the Internet: URL: http://www.3gpp.org/ftp/Meetings%5F3GPP%5FSYNC/RANI/Docs/ RI%2DI907136%2Ezip [Retrieved on May 13, 2019] paragraph [0005]—paragraph [0006].
International Search Report and Written Opinion—PCT/US2021/065394—ISA/EPO—dated May 2, 2022.
Nokia, et al., "Discussion of Physical Layer Structure for Sidelink", Draft, 3GPP TSG RAN WG1 #98bis, R1-1910512, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 8, 2019 (Oct. 8, 2019), XP051809140, 16 pages, Retrieved from the Internet: URL: https://ftp.3gpp.org/tsg_ran/WG1_RL1/TSGR1_98b/Docs/R1-1910512.zip [retrieved on Oct. 8, 2019] p. 4 p. 5-p. 6, table 1, paragraph [02.2].
TCL Communication: "Resource Allocation for NR Sidelink Mode 2", Draft, 3GPP TSG RAN1 WG1 Meeting #98bis, R1-1910411, 3rd Generation Partnership Project (3GPP), Mobile Competence Centre, 650, Route Des Lucioles, F-06921, Sophia-Antipolis Cedex, France, vol. RAN WG1, No. Chongqing, CN, Oct. 14, 2019-Oct. 20, 2019, Oct. 2019 (Oct. 4, 2019), XP051808185, pp. 1-8, URL: https://ftp.3gpp.org/tsg_ran/WG1_RL1/TSGR1_98b/Docs/R1-1910411.zip [retrieved on Oct. 4, 2019] Preemption Indication on Sidelink Channels, pp. 6-7, paras. [003]-[0004].

\* cited by examiner ical Field

The present disclosure relates generally to communication systems, and more particularly, to sidelink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a sidelink device. An example apparatus transmits sidelink control information (SCI) reserving a set of resources for one or more retransmissions of a message (e.g., a sidelink transmission), the set of resources identifying one or more reserved resources in a time domain. The example apparatus also identifies a skipped transmission associated with one or more of the set of resources reserved by the sidelink device. Additionally, the example apparatus transmits a cancelation indication indicating the skipped transmission, the cancelation indication indicating that the skipped transmission corresponds to a previous reserved resource in the time domain, a current reserved resource in the time domain, or a future reserved resource in the time domain.

In another aspect of the disclosure, a method, a computer-readable medium, and an apparatus are provided for wireless communication of a first sidelink device. An example apparatus receives receiving, from a second sidelink device, SCI reserving a set of resources for retransmissions of a message, the set of resources identifying one or more reserved resources in a time domain. The example apparatus also receives, from the second sidelink device, a cancelation indication indicating a skipped transmission, the cancelation indication indicating that the skipped transmission corresponds to a previous reserved resource in the time domain, a current reserved resource in the time domain, or a future reserved resource in the time domain.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
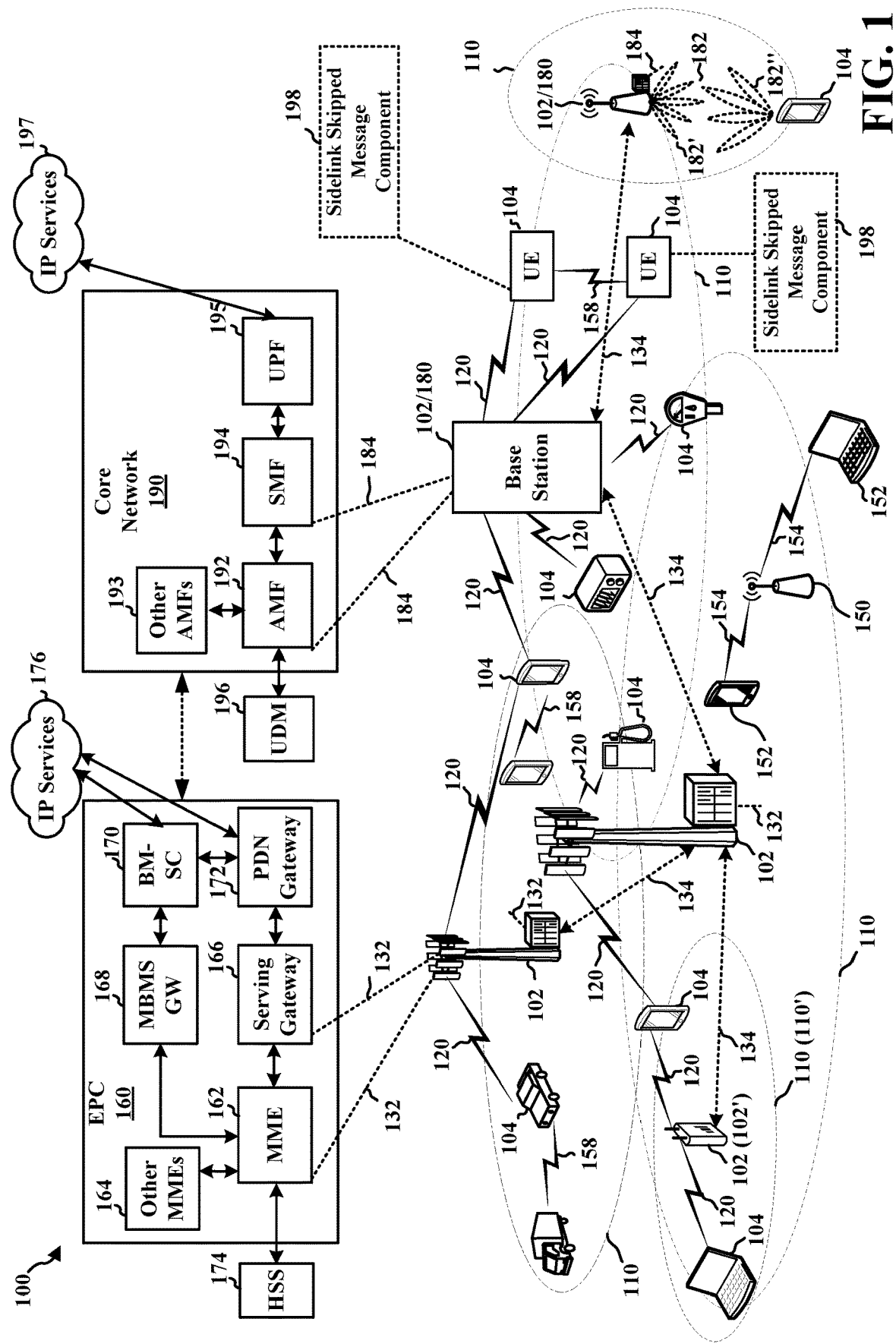
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Sidelink communication enables a first UE to communicate with another UE directly. For example, the first UE and the other UE may communicate without routing the communication through a base station. Sidelink may be beneficial for vehicle-based communications that allows a vehicle UE to communicate directly with another UE associated with, for example, another vehicle, a vulnerable road user (e.g., a pedestrian, a person on a bike, etc.), a network node, an infrastructure node, etc.

In general, sidelink supports two different resource allocation modes. In a first resource allocation mode ("Mode 1"), a base station schedules sidelink resources to be used by a UE for transmitting messages (e.g., for transmitting sidelink transmissions). Such a resource allocation mode may be referred to as a "centralized resource allocation mechanism."

In a second resource allocation mode ("Mode 2"), the UE determines (e.g., without base station scheduling) the sidelink transmission resource(s) within a sidelink resource pool configured by the network (e.g., a base station) or determines the sidelink transmission resource(s) within a preconfigured sidelink resource pool. Such a resource allocation mode may be referred to as a "distributed resource allocation mechanism" or a "decentralized resource allocation mechanism."

When a UE employs the second resource allocation mode (Mode 2), the UE may select the sidelink transmission resource(s) using sensing and resource reservation. Resource reservation may be carried in sidelink control information (SCI). A message (e.g., sidelink transmission) may reserve resources in a current slot and future slots. In some examples, the UE may reserve resources in the future slots for retransmissions. For example, a first UE may transmit SCI at a current resource indicating the current resource and reserving a first retransmission resource and a second retransmission resource for retransmissions. The first UE may transmit data using the current resource and may retransmit the data using the first retransmission resource and the second retransmission resource. A second UE may receive the data at the current resource, the first retransmission resource, and the second retransmission resource. The second UE may apply decoding techniques, such as soft-combining of the data received at the three resources, to decode the message.

However, in some scenarios, a resource reserved for a retransmission may be pre-empted or collide with traffic from other devices. For example, the first UE may determine to use the first retransmission resource to transmit data with a higher priority to another communication device. In other examples, due to high interference, the first UE may determine that the retransmission of the message using the first retransmission resource does not satisfy a quality threshold and may not be usable by the second UE when applying decoding techniques to decode the data.

Aspects disclosed herein provide techniques for the first UE to indicate to the second UE of a "skipped transmission". As used herein, the term "skipped transmission" (sometimes referred to as a "canceled transmission" or a "canceled message") may refer to a transmission that is not a retransmission of the message (e.g., in the case of pre-emption) or may refer to a retransmission that is not usable by the second UE for decoding data (e.g., in the case of high interference or collision). When the second UE receives an indication of a skipped transmission, the second UE may forego using the information from the indicated skipped transmission to decode the data.

Aspects disclosed herein indicate a skipped transmission via a cancelation indication. The cancelation indication may refer to a current resource, a past resource, or a future resource. In some examples, the first UE may transmit the cancelation indication when the first UE identifies a skipped transmission. For example, the first UE may detect high interference associated with a previous retransmission (e.g., associated with a past retransmission resource), may detect the occurrence of a collision with a retransmission using a current resource, or may determine to pre-empt a future resource for a higher priority message. In such examples, the first UE may transmit the cancelation indication after identifying the skipped transmission. In some examples, the first UE may transmit the cancelation indication during monitoring occasions negotiated between the first UE and the second UE.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, for example, using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as, for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as a Road Side Unit (RSU), etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

In some examples, a sidelink communication device, such as a UE 104 or other device communicating based on sidelink, may be configured to manage one or more aspects of wireless communication by facilitating indicating a skipped transmission to another wireless communication device. As an example, in FIG. 1, the UE 104 may include a sidelink skipped message component 198 configured to transmit SCI reserving a set of resources for one or more retransmissions of a message, the set of resources identifying one or more reserved resources in a time domain. The example sidelink skipped message component 198 may also be configured to identify a skipped transmission associated with one or more of the set of resources reserved by the sidelink device. Additionally, the example sidelink skipped message component 198 may be configured to transmit a cancelation indication indicating the skipped transmission, the cancelation indication indicating that the skipped transmission corresponds to a previous reserved resource in the time domain, a current reserved resource in the time domain, or a future reserved resource in the time domain.

Still referring to FIG. 1, a receiving UE 104 may similarly include a sidelink skipped message component 198 configured to receive, from a second sidelink device, SCI reserving a set of resources for retransmissions of a message, the set of resources identifying one or more reserved resources in a time domain. The example sidelink skipped message component 198 may also be configured to receive, from the second sidelink device, a cancelation indication indicating a skipped transmission, the cancelation indication indicating that the skipped transmission corresponds to a previous reserved resource in the time domain, a current reserved resource in the time domain, or a future reserved resource in the time domain.

Although the following description provides examples directed to 5G NR (and, in particular, to sidelink communications via 5G NR), the concepts described herein may be applicable to other similar areas, such as LTE, LTE-A, CDMA, GSM, and/or other wireless technologies, in which a sidelink communication device may detect an occurrence of a skipped transmission.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and the UE 104, the aspects may be similarly applied between a first device and a second device (e.g., a first UE and a second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
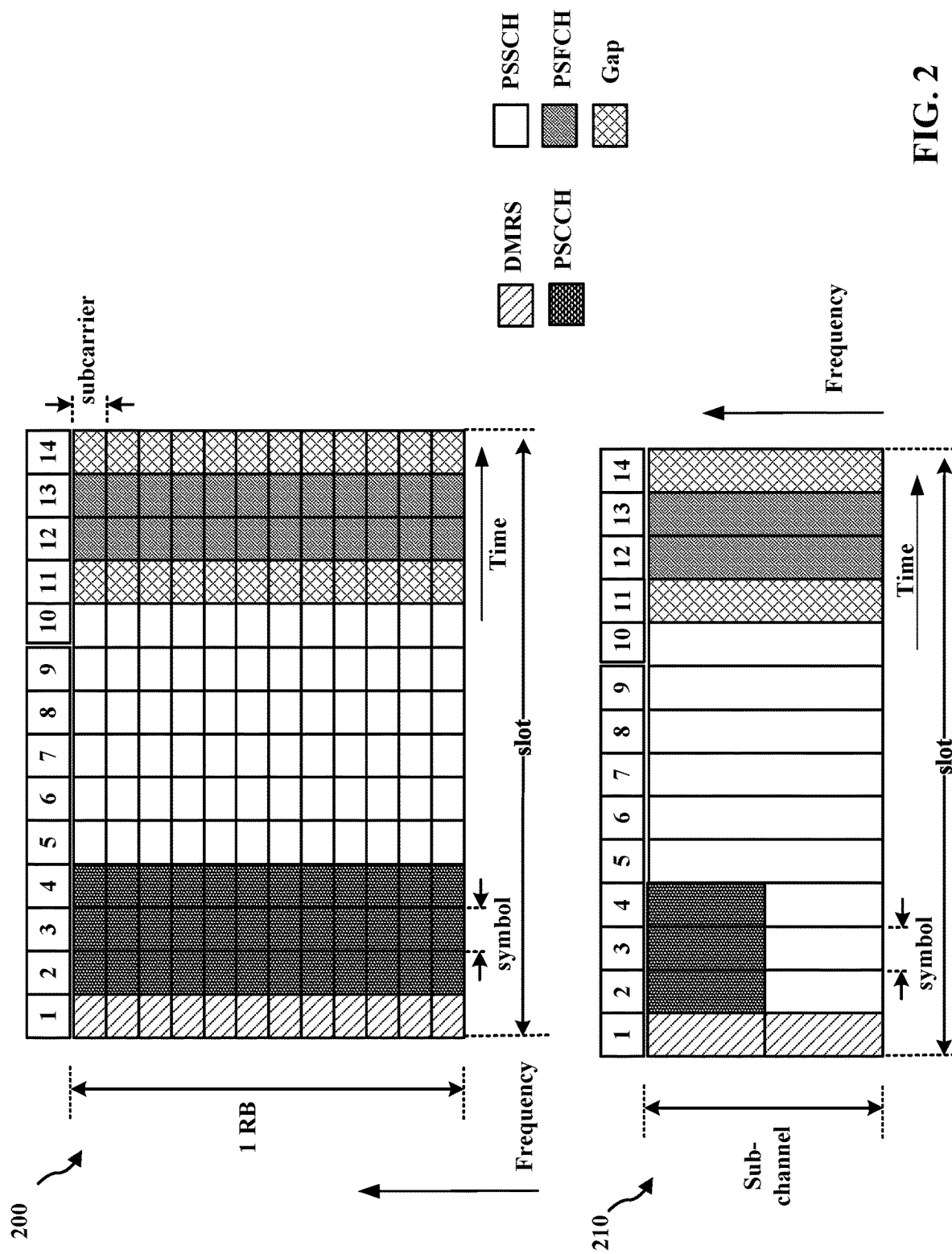
FIG. 2 is a diagram illustrating example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSUs, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
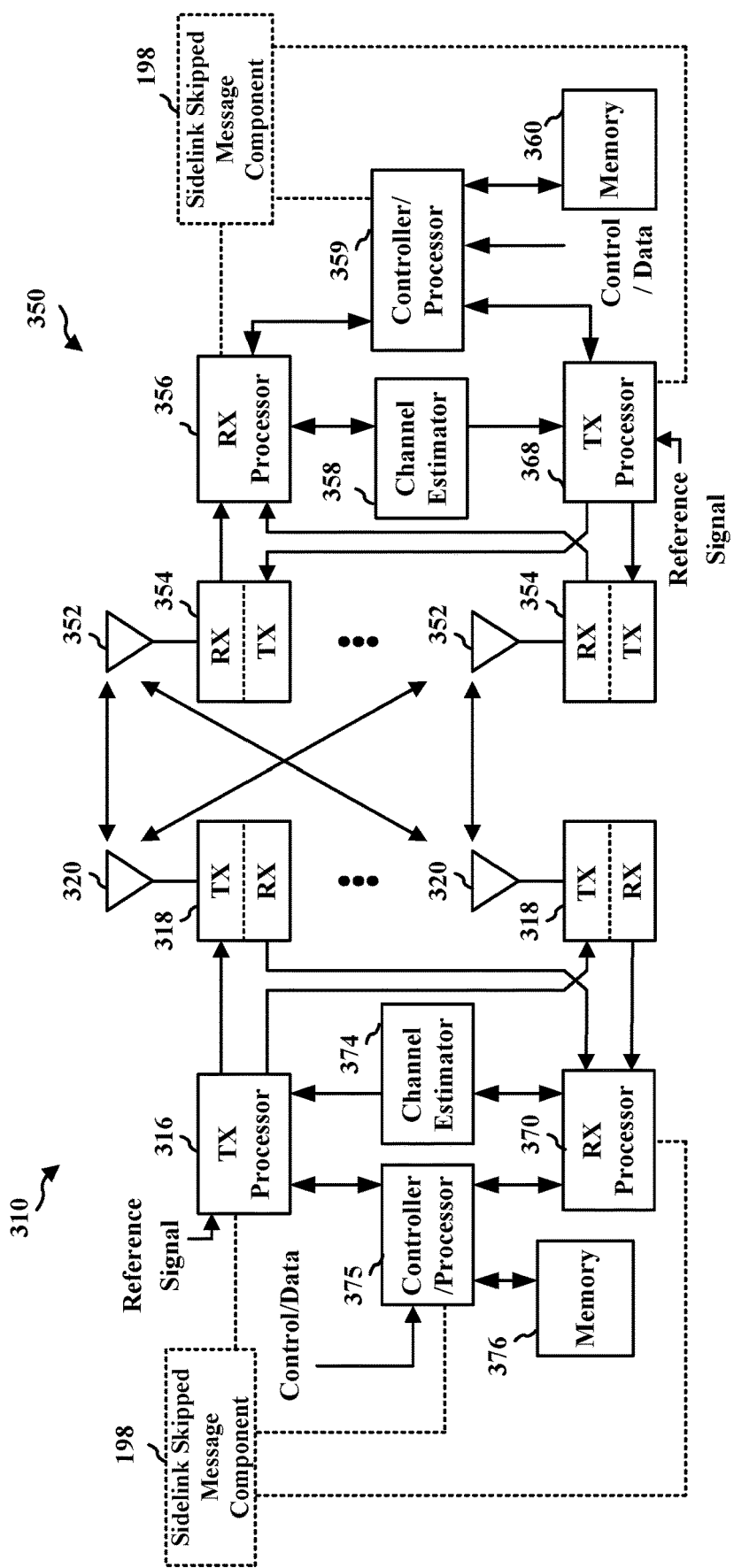
FIG. 3 is a diagram illustrating an example of first device and a second device involved in wireless communication based on, for example, sidelink.

FIG. 3 is a block diagram of a first communication device 310 in communication with a second communication device 350 based on sidelink. The first communication device 310 may comprise a transmitting device communicating with one or more target devices using the second communication device 350. The first communication device 310 may communicate with the second communication device 350 using sidelink communication. The first communication device 310 and/or the second communication device 350 may comprise a UE, an access point, a base station, a road side unit (RSU), etc.

In some examples, the communication devices 310, 350 may communicate based on D2D communication, such as V2X. The communication may be based on sidelink using a PC5 interface. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

A transmit (TX) processor 316 and a receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second communication device 350. Each spatial stream may then be provided to a different antenna 320 via a separate transmitter 318 TX. Each transmitter 318 TX may modulate an RF carrier with a respective spatial stream for transmission.

At the second communication device 350, each receiver 354 RX receives a signal through its respective antenna 352. Each receiver 354 RX recovers information modulated onto an RF carrier and provides the information to the receive (RX) processor 356. A TX processor 368 and a RX processor 356 implement layer 1 functionality associated with various signal processing functions. The RX processor 356 may perform spatial processing on the information to recover any spatial streams destined for the second communication device 350. If multiple spatial streams are destined for the second communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first communication device 310. These soft decisions may be based on channel estimates computed by the channel estimator 358. The soft decisions are then decoded and deinterleaved to recover the data and control signals that were originally transmitted by the first communication device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the transmission by the first communication device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the first communication device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The received transmission may be processed at the first communication device 310 in a manner similar to that described in connection with the receiver function at the second communication device 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. For a transmission, the controller/processor 375 provides demultiplexing between transport and logical channels, packet reassembly, deciphering, header decompression, control signal processing to recover IP packets from the second communication device 350. IP packets from the controller/processor 375 may be provided to the EPC 160. The controller/processor 375 is also responsible for error detection using an ACK and/or NACK protocol to support HARQ operations.

At least one of the TX processor 316 or 368, the RX processor 356 or 370, and the controller/processor 359 or 375 may be configured to perform aspects in connection with the sidelink skipped message component 198 of FIG. 1.

Figure 4:
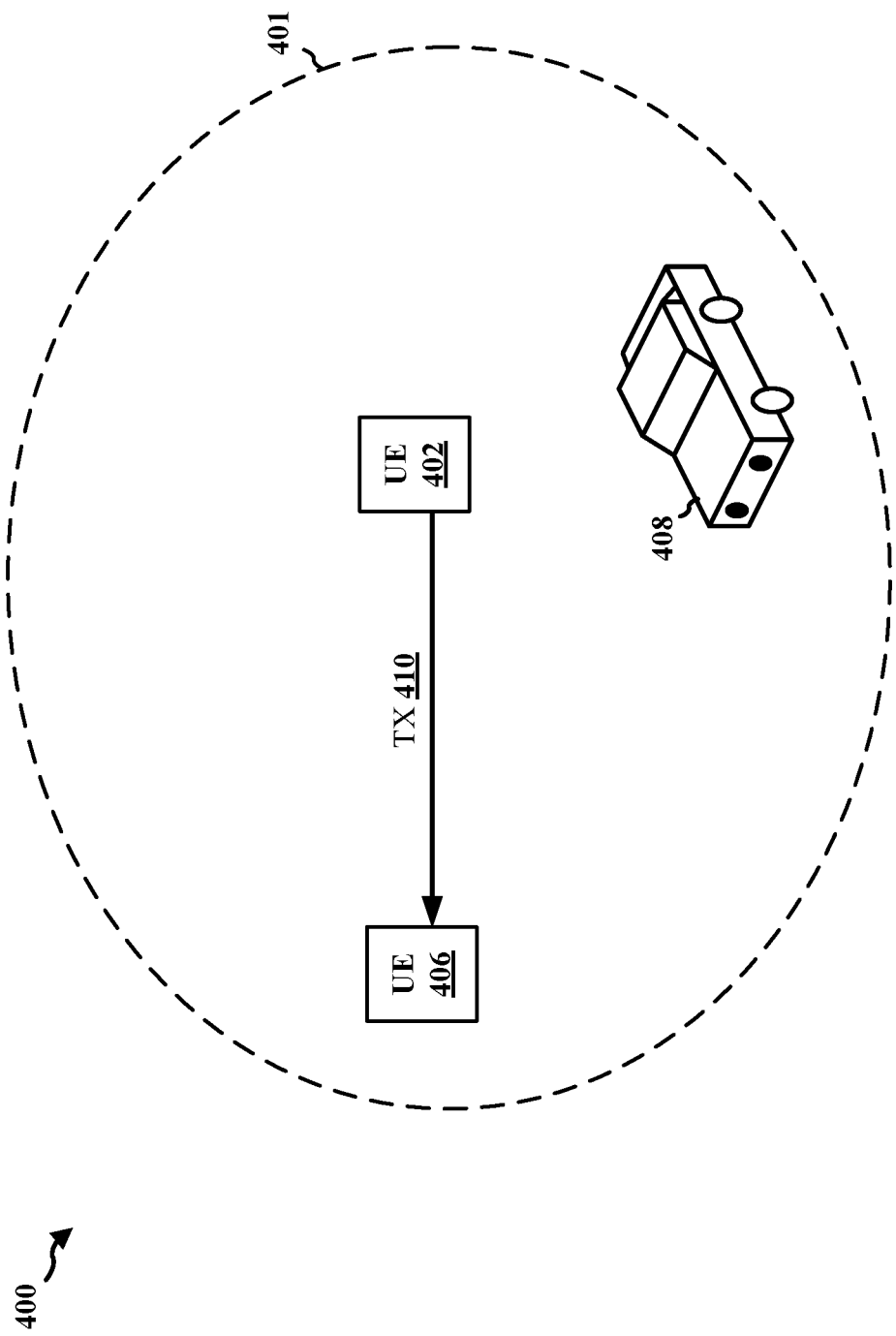
FIG. 4 is a diagram illustrating an example system based on sidelink communication, in accordance with the teachings disclosed herein.

FIG. 4 illustrates an example communications environment 400 of wireless communication between devices based on sidelink communication. The communication may be based on a slot structure comprising aspects described in connection with FIG. 2. For example, a transmitting device 402 (sometimes referred to as an "originating device" or a "transmitting UE") may transmit a message 410 ("TX") (e.g., a sidelink transmission comprising, for example, a control channel (e.g., a PSCCH) and/or a corresponding data channel (e.g., a PSSCH), that may be received by a target device 406 directly from the transmitting device 402 (e.g., without being transmitted through a base station).

The transmitting device 402 may provide SCI with information for decoding a corresponding data channel. The SCI may also include information that a receiving device may use to avoid interference. For example, the SCI may indicate time and frequency resources that will be occupied by the data portion of the message, and may be indicated in a control message from the transmitting device.

The devices 402, 406, may each be capable of operating as a transmitting device in addition to operating as a receiving device. The message 410 may be unicast, multicast (sometimes referred to as "groupcast"), or broadcast to nearby devices. For example, the transmitting device 402 may transmit the message 410 intended for receipt by other devices within a range 401 of the transmitting device 402 (e.g., the target device 406 and a vehicle UE 408).

Sidelink communication enables a first UE to communicate with another UE directly. For example, the first UE and the other UE may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE. When dealing with V2X communication, power consumption by the vehicle UE might not be a concern.

In general, sidelink supports two different resource allocation modes. In a first resource allocation mode ("Mode 1"), a base station schedules sidelink resources to be used by a UE for transmitting messages (e.g., for transmitting sidelink transmissions). Such a resource allocation mode may be referred to as a "centralized resource allocation mechanism."

In a second resource allocation mode ("Mode 2"), the UE determines (e.g., without base station scheduling) the sidelink transmission resource(s) within a sidelink resource pool configured by the network (e.g., a base station) or determines the sidelink transmission resource(s) within a preconfigured sidelink resource pool. Such a resource allocation mode may be referred to as a "distributed resource allocation mechanism" or a "decentralized resource allocation mechanism."

When a UE employs the second resource allocation mode (Mode 2), the UE may select the sidelink transmission resource(s) using sensing and resource reservation. Resource reservation may be carried in sidelink control information (SCI). A message (e.g., a sidelink transmission) may reserve resources in a current slot and future slots.

Figure 5:
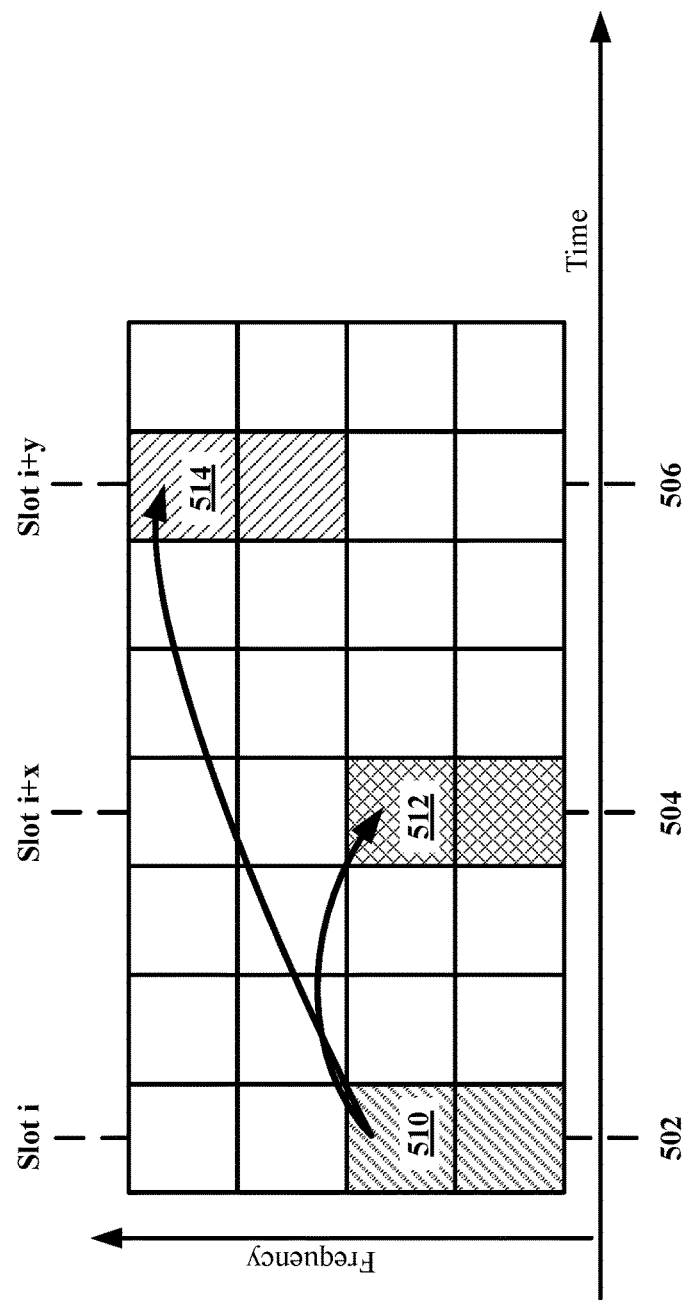
FIG. 5 illustrates a reservation window comprising slots, in accordance with the teachings disclosed herein, in accordance with the teachings disclosed herein.

Resource allocation may be in units of sub-channels in the frequency domain and may be limited to one slot in the time domain. A message may reserve resources in the current slot and in future slots. Reservation information may be carried in the SCI. Additionally, reservations may be reserved within a window of 32 slots. FIG. 5 illustrates a reservation window 500 comprising 32 slots, as presented herein. In the illustrated example of FIG. 5, the reservation window 500 comprises frequency domain resources along the vertical axis and time domain resources along the horizontal axis. However, it may be appreciated that other examples may employ additional or alternative techniques for implementing the reservation window.

In the illustrated example of FIG. 5, a UE may transmit a first message using a first resource 510 (e.g., a first slot i) at a first time 502. The UE may also transmit SCI (e.g., via the first message) reserving future resources, for example, to transmit a retransmission of the first packet. For example, the SCI may include frequency domain resource allocations (FDRA) that point to frequency domain resources (e.g., sub-channels) corresponding to one or more future resources. The SCI may also include time domain resource allocations (TDRA) that point to time resources (e.g., slots) corresponding to the one or more future resources.

As shown in FIG. 5, the UE reserves a first future resource 512 (e.g., at slot i+x) at a second time 504 and reserves a second future resource 514 (e.g., at slot i+y) at a third time 506. As the resources 512, 514 are associated with future resources, the values of x and y are greater than 0. Additionally, since the reservation window 500 includes 32 slots, the values of x and y are also less than or equal to 31 (e.g., assuming that the first slot is slot 0). In the illustrated example, the value of x may be greater than 0 and less than or equal to 31. The value of y may be greater than x and less than or equal to 31 since the second future resource 514 occurs after the first future resource 512.

In some examples, a resource may be pre-empted. For example, a transmitting device may reserve resources for a first type of traffic and then the transmitting device may identify data with a higher priority.

Figure 6:
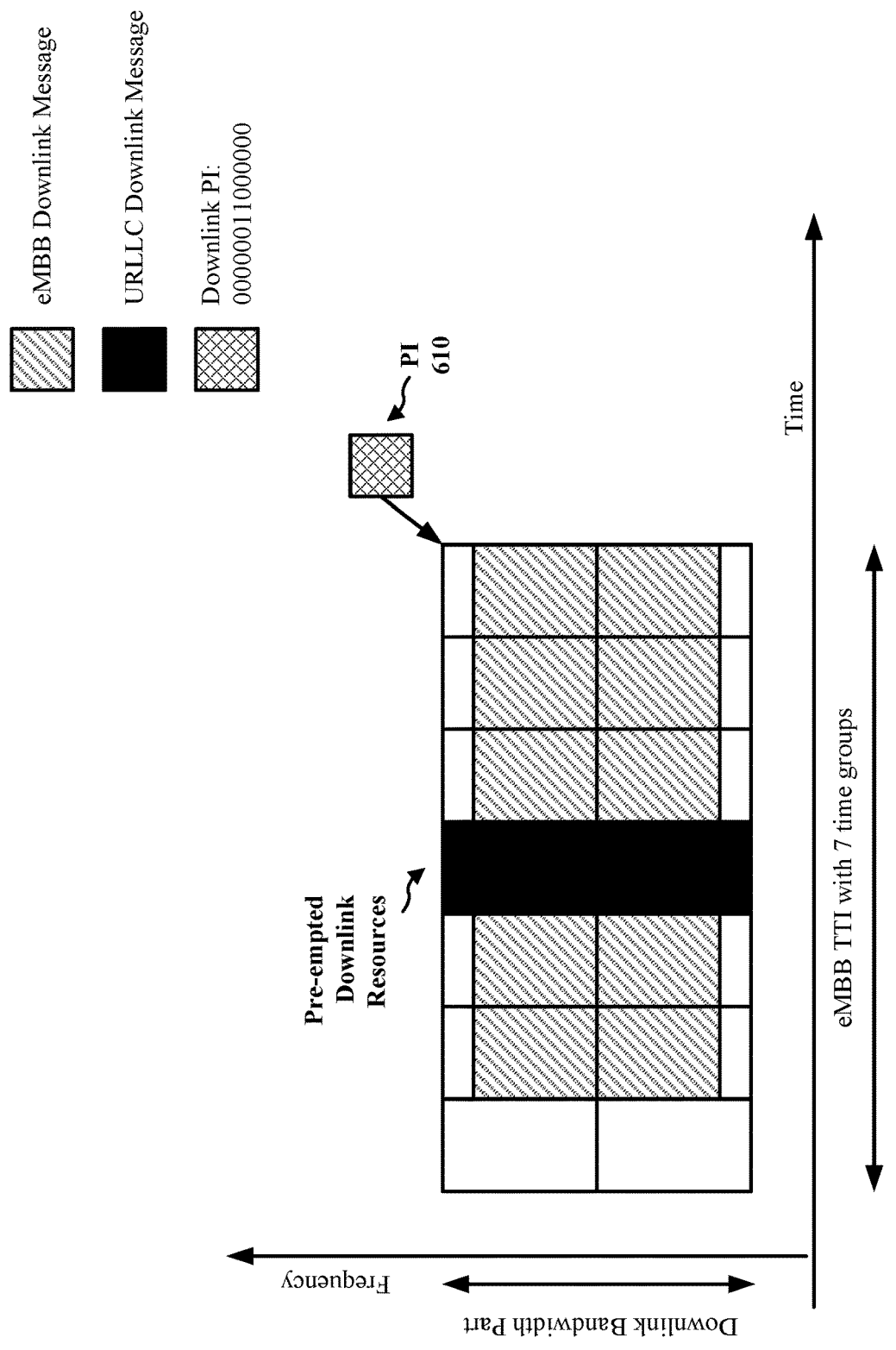
FIG. 6 illustrates an example resource window comprising time groups in a downlink bandwidth part, in accordance with the teachings disclosed herein.

FIG. 6 illustrates an example resource window 600 comprising seven time groups in a downlink bandwidth part. The resource window 600 comprises frequency domain resources along the vertical axis and time domain resources along the horizontal axis. However, it may be appreciated that other examples may employ additional or alternative techniques for implementing the resource window.

In the illustrated example of FIG. 6, the resources are associated with downlink traffic (e.g., messages from a base station). As shown in FIG. 6, resources associated with seven time groups are allocated for eMBB downlink messages. For example, the base station may transmit a grant reserving the seven time groups. However, the base station may later identify (e.g., after allocating the seven time groups for the eMBB downlink message) URLLC traffic. In such instances, the base station may preempt one or more of the resources reserved for the eMBB to use for the URLLC traffic. In the illustrated example, the base station pre-empts the downlink resources associated with a fourth time group to use to transmit the URLLC traffic. The base station may then transmit a pre-emption indication (PI) 610 to the eMBB indicating that one or more of the resources in the previous grant were pre-empted. The base station may transmit the PI 610 via downlink control information (e.g., DCI 2_1). In some examples, the PI may comprise a bitmap indicating pre-empted resources. In the illustrated example, the PI 610 comprises fourteen bits and indicates that the seventh and eighth resources were pre-empted.

The eMBB for which the resources were reserved may try to reconstruct the eMBB traffic. However, based on the PI 610, the eMBB may determine which resources of the resource window 600 were not used to transmit eMBB traffic. Based on the resources that were not pre-empted, the eMBB may try to decode the eMBB traffic.

Figure 7:
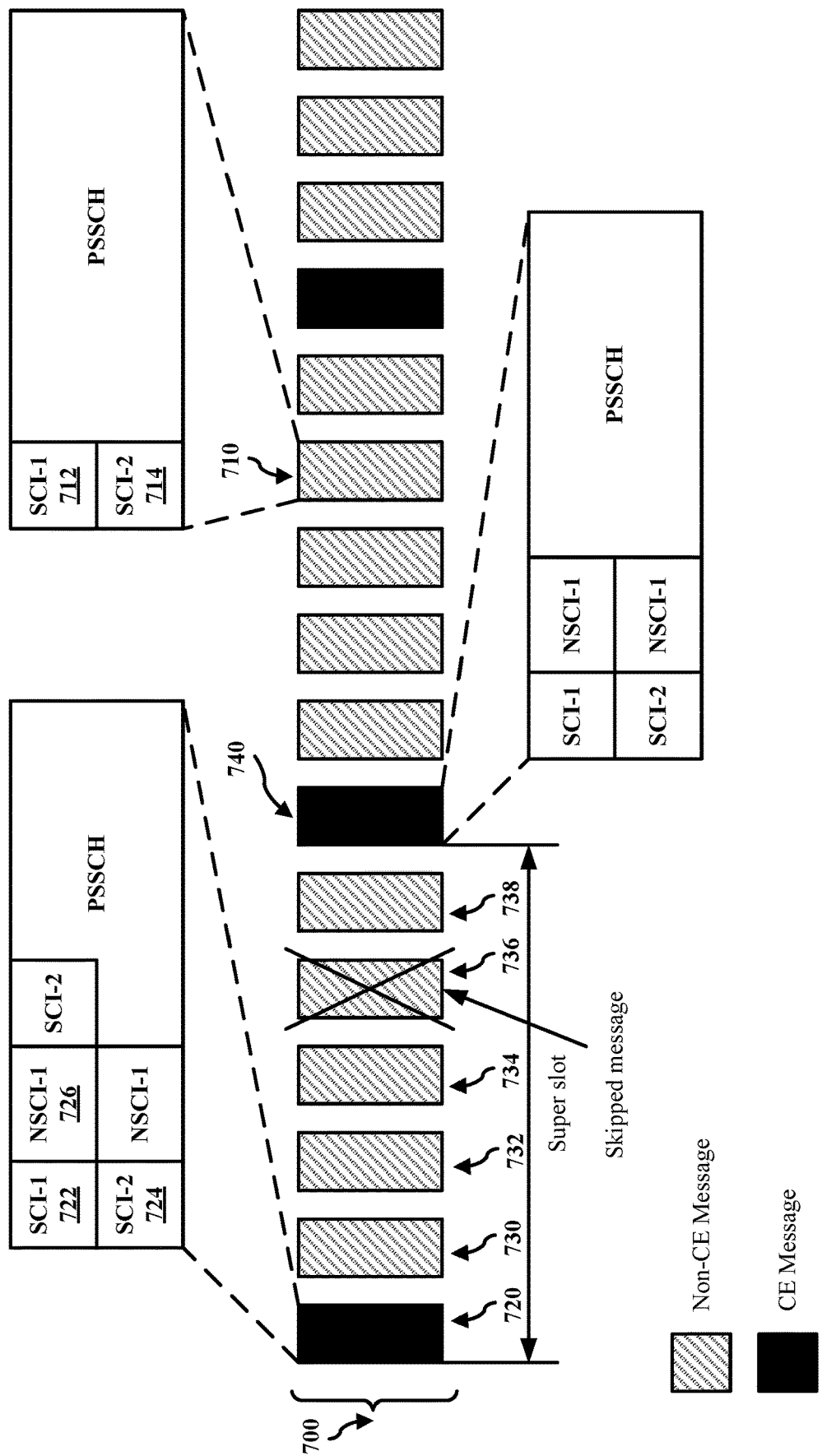
FIG. 7 depicts an example series of message transmissions from a transmitting sidelink UE to a receiving sidelink UE, in accordance with the teachings disclosed herein.

Thus, it may be appreciated that reserved retransmission resources may be preempted or collide with other traffic. FIG. 7 depicts an example series of message transmissions 700 from a transmitting sidelink UE to a receiving (or target) sidelink UE, as presented herein. Each of the messages include SCI. However, as the contents of the SCI may be large, it may be beneficial to split the contents of the SCI into multiple stages. As shown in FIG. 7, the SCI includes two-stage SCI. For example, a first message 710 includes a first stage SCI 712 (SCI-1) and a second stage SCI 714 (SCI-2). The first stage SCI 712 may be transmitted via a control channel while the second stage SCI 714 may be transmitted via a control channel and/or a data channel. The first stage SCI 712 may include information regarding the PSSCH resources and information for decoding the second stage SCI 714, such as time-frequency resources of PSSCH, the priority of a transport block transmission, etc.). The second stage SCI 714 may comprise additional information, such as scheduling information for the PSSCH decoding by the receiving sidelink UE. By employing a two-stage SCI, the payload of the first stage SCI 712 may be reduced. In some examples, the two-stage SCI may improve the ability for sidelink devices to perform resource sensing as a receiving sidelink UE may use the information of the first stage SCI (SCI-1) to determine whether a resource (or future resource) is available.

In some examples, the SCI may be limited to reserving two future resources for retransmissions. However, in some scenarios, it may be beneficial to enable the transmitting sidelink UE to reserve more than two future resources. For example, to facilitate coverage extension (CE), a transmitting sidelink UE may also transmit new SCI (NSCI). For example, when a transmitting sidelink UE is attempting to extend coverage, the transmitting sidelink UE may transmit a signal to reach a larger geographic area, thereby enabling the signal to be received by relatively further away UEs. However, because the signal is being extended to further UEs, it may be beneficial to allow the transmitting sidelink UE to reserve more than two future resources for retransmissions to decoding at a receiving sidelink UE. Thus, while the first stage SCI (SCI-1) may reserve two future resources, the NSCI (NSCI-1) may reserve more than two future resources.

As used herein, a message including an NSCI may be referred to as a "coverage extension" (CE) message. As used herein, a message that does not include NSCI may be referred to as a "non-coverage extension" (non-CE) message. Additionally, the term "message" may refer to a coverage extension message and/or a non-coverage message.

In the illustrated example, a first CE message 720 comprises a first stage SCI (SCI-1 722), at least one second stage SCI (SCI-2 724), and at least one NSCI 726. In some examples, the NSCI 726 may indicate the one or more future resources for retransmissions. For example, the NSCI 726 may reserve resources associated with a first retransmission 730, a second retransmission 732, a third retransmission 734, a fourth retransmission 736, and a fifth retransmission 738. In some examples, the NSCI 726 may indicate one or more future resources in addition to any resources reserved by the first stage SCI (SCI-1). For example, the SCI-1 722 may reserve two future resources, such as resources associated with the first retransmission 730 and the second retransmission 732, and the NSCI 726 may indicate the resources associated with the third retransmission 734, the fourth retransmission 736, and the fifth retransmission 738.

In some examples, the coverage extension messages may include a first stage SCI (SCI-1), two second stage SCIs (SCI-2), and two NSCIs, as shown in connection with the first CE message 720. In other examples, the coverage extension messages may include a first stage SCI (SCI-1), one second stage SCI (SCI-2), and two NSCIs, as shown in connection with a second CE message 740. It may be appreciated that other examples may include additional or alternative combinations of the first stage SCI, the second stage SCI, and the NSCI.

However, because including the NSCI in a message reduces the available payload for data (e.g., the PSSCH), it may be beneficial to forego transmitting NSCI in each message. For example, in the illustrated example of FIG. 7, a transmitting sidelink UE transmits a CE message after transmitting five non-CE messages. As shown in FIG. 7, the messages from a first CE message to a second CE message may be referred to as a "super slot."

A receiving sidelink UE may apply decoding techniques, such as soft-combining, to decode improve signal detection and improve decoding. For example, the receiving sidelink UE may perform soft-combining of the messages associated with a super slot (e.g., the first CE message 720 and the retransmissions 730, 732, 734, 736, 738) by accumulating the signals received via the messages associated with the super slot.

However, if the transmitting sidelink UE skips transmitting a message, then the receiving sidelink UE may erroneously include the signal from the skipped transmission when performing the soft-combining. For example, in the illustrated example, the fourth retransmission 736 is a skipped transmission. The transmitting sidelink UE may skip transmitting a message due to, for example, pre-emption of a reserved resource, an interference measurement associated with the reserved resource, collision detection, or congestion control.

Aspects disclosed herein provide techniques for the transmitting sidelink UE to indicate to the receiving sidelink UE of a skipped transmission. As used herein, the term "skipped transmission" (sometimes referred to as a "canceled transmission" or a "canceled message") may refer to a transmission that is not a retransmission of the message (e.g., in the case of pre-emption or congestion control) or may refer to a retransmission that is not usable by the receiving sidelink UE for decoding data (e.g., in the case of high interference or collision detection). When the receiving sidelink UE receives an indication of a skipped transmission, the receiving sidelink UE may forego using the information from the indicated skipped transmission to decode the data.

Aspects disclosed herein indicate a skipped transmission via a cancelation indication (CI). The cancelation indication may refer to a current resource, a past resource, or a future resource. In some examples, the transmitting sidelink UE may receive a cancelation indication from a base station that the transmitting sidelink UE forwards to the receiving sidelink UE. The transmitting sidelink UE may receive the cancelation indication from the base station via an access link (e.g., a Uu interface). For example, the transmitting sidelink UE may receive the cancelation indication via one or more of DCI, a MAC—control element (MAC-CE), and/or RRC signaling. In some examples, the transmitting sidelink UE may transmit the cancelation indication when the transmitting sidelink UE identifies a skipped transmission. For example, the transmitting sidelink UE may detect high interference associated with a previous retransmission (e.g., associated with a past retransmission resource), may detect the occurrence of a collision with a retransmission using a current resource, or may determine to pre-empt a future resource for a higher priority message. In such examples, the transmitting sidelink UE may transmit the cancelation indication after identifying the skipped transmission. In some examples, the transmitting sidelink UE may transmit the cancelation indication during monitoring occasions negotiated between the transmitting sidelink UE and the receiving sidelink UE. The receiving sidelink UE may then discard the message associated with the indicated resource and improve the decoding of the message.

Referring again to the example of FIG. 5, a transmitting sidelink UE may transmit the first message using the first resource 510 (e.g., the slot i) at the first time 502 and also reserve the first future resource 512 (e.g., the slot i+x) at the second time 504 and reserves the second future resource 514 (e.g., the slot i+y) at the third time 506. At the second time 504, the transmitting sidelink UE may transmit a second message using the first future resource 512 and then measure a high interference associated with the second message. In such examples, the transmitting sidelink UE may transmit the cancelation indication via a third message at the third time 506. The cancelation indication may include an indication pointing to the slot i+x and indicate that there was high interference associated with the respective message. The receiving sidelink UE may discard the message at slot i+x when performing soft-combining and, thus, may improve decoding of the signal.

In some examples, a transmitting sidelink UE may forego transmitting SCI (and/or NSCI) in a message. For example, the transmitting sidelink UE may not transmit SCI (and/or NSCI) when a message is associated with semi-persistent scheduling (SPS) or a configured grant (CG).

For example, referring to the example of FIG. 5, the transmitting sidelink UE may include SCI (and/or NSCI) in the first message at the slot i, forego transmitting SCI (and NSCI) in the second message at the slot i+x, and include SCI (and/or NSCI) in the third message at the slot i+y. In such examples, it may be beneficial for the transmitting sidelink UE to indicate to the receiving sidelink UE that the second message at the slot i+x is a skipped transmission.

Figure 8:
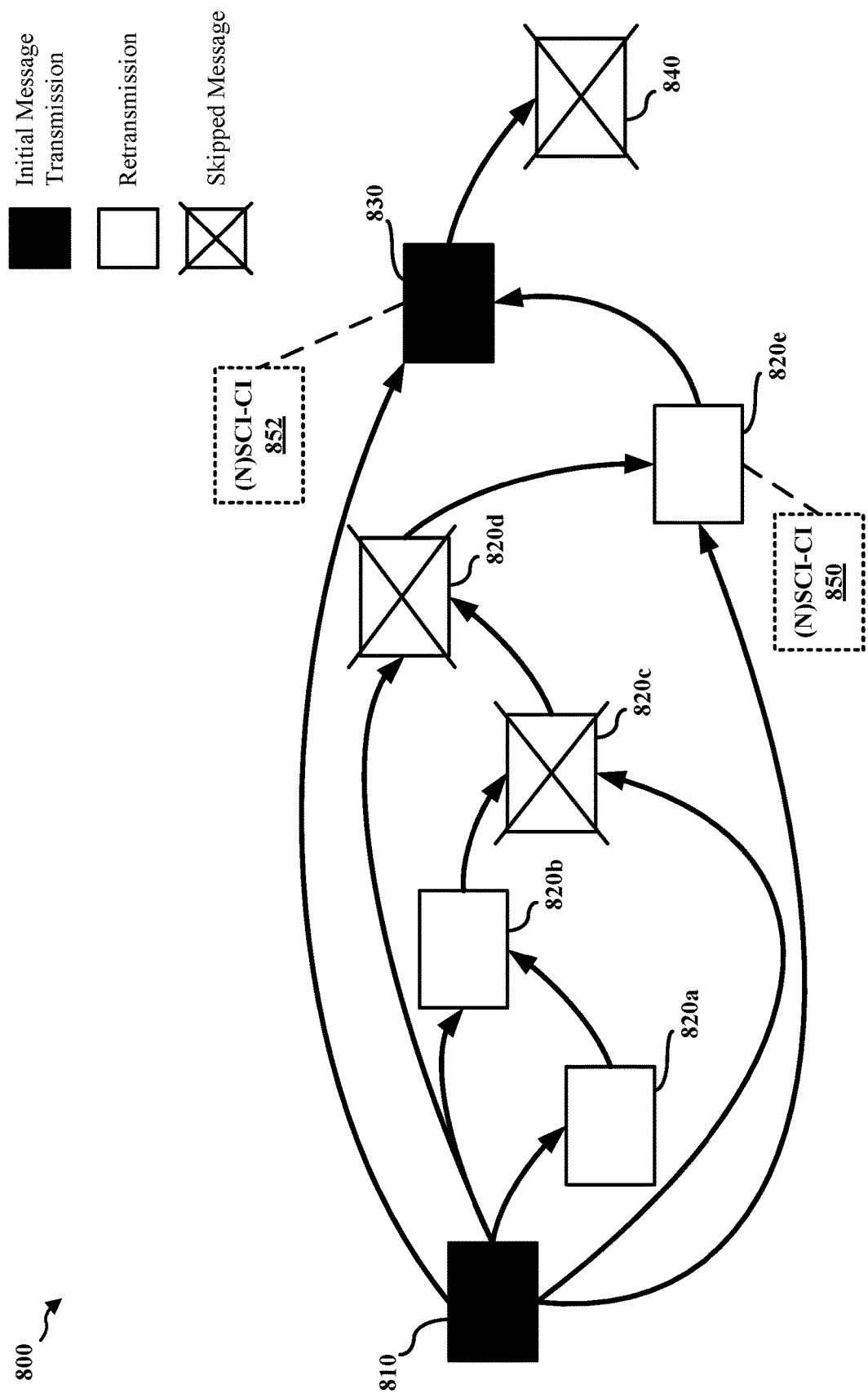
FIG. 8 depicts a series of message transmissions from a transmitting sidelink UE to a receiving sidelink UE, in accordance with the teachings disclosed herein.

FIG. 8 depicts a series of message transmissions 800 from a transmitting sidelink UE to a receiving sidelink UE, as presented herein. In the illustrated example, the message transmissions 800 include a first initial message 810 and a second initial message 830. The initial messages 810, 830 may comprise SCI (and/or NSCI) reserving one or more future resources for retransmissions. For example, the first initial message 810 may reserve a set of resources associated with retransmissions 820a-820e. The second initial message 830 may reserve a set of resources associated with retransmission 840.

In some examples, the transmitting sidelink UE includes cancelation indication with SCI (and/or NSCI). The transmitting sidelink UE may transmit the SCI (and/or the NSCI) and the cancelation indication (generally referred to as "(N)SCI-CI") after detecting a (N)SCI-CI message triggering event. In some examples, a (N)SCI-CI message triggering event may include identifying one or more skipped transmissions. In some examples, the transmitting sidelink UE transmits the (N)SCI-CI after a threshold quantity of consecutive skipped transmissions. For example, the transmitting sidelink UE may identify a (N)SCI-CI message triggering after identifying two consecutive skipped transmissions and then transmit the (N)SCI-CI. In some examples, the transmitting sidelink UE transmits the (N)SCI-CI after a threshold quantity of skipped transmissions. For example, the transmitting sidelink UE may detect a (N)SCI-CI message triggering event after identifying a second skipped transmission out of three messages and then transmit the (N)SCI-CI.

In such examples, the transmitting sidelink UE may transmit the (N)SCI-CI using a reserved resource. For example, in the illustrated example of FIG. 8, the transmitting sidelink UE may identify the third retransmission 820c and the fourth retransmission 820d as skipped transmissions (e.g., due to pre-emption of a reserved resource, an interference measurement associated with the reserved resource, collision detection, or congestion control). As a result, the transmitting sidelink UE may use the fifth retransmission 820e to include an (N)SCI-CI 850 indicating that the third retransmission 820c and the fourth retransmission 820d are skipped transmissions.

In some examples, the (N)SCI-CI may comprise one or more bits indicating a quantity of skipped transmissions. For example, the (N)SCI-CI 850 may indicate two skipped transmissions. The receiving sidelink UE may then identify the two skipped transmissions based on when the receiving sidelink UE receives the (N)SCI-CI 850. For example, in the example of FIG. 8, since the transmitting sidelink UE uses the fifth retransmission 820e to transmit the (N)SCI-CI 850 and the (N)SCI-CI 850 indicates two skipped transmissions, the receiving sidelink UE may determine that the third retransmission 820c and the fourth retransmission 820d are the skipped transmissions. Accordingly, the receiving sidelink UE may discard the respective retransmissions 820c, 820d when performing decoding techniques.

In some examples, the (N)SCI-CI 850 may comprise a bitmap, for example, within a window. For example, the (N)SCI-CI 850 may comprise six bits and where each bit corresponds to a respective one of the first initial message 810 and the five retransmissions 820a-820e. Based on the bitmap, the receiving sidelink UE may discard the respective retransmissions 820c, 820d when performing decoding techniques.

In some scenarios, the transmitting sidelink UE may be configured to transmit SCI (and/or NSCI) when transmitting an initial message (e.g., the initial messages 810, 830) and to forego including SCI (and/or NSCI) when transmitting a retransmission (e.g., the retransmissions 820a-820e, 840). However, in some such examples, it may be beneficial for the transmitting sidelink UE to use a resource reserved for a retransmission to retransmit the (N)SCI-CI. For example, when the (N)SCI-CI comprises a quantity of skipped transmissions, it may be beneficial for the transmitting sidelink UE to use a next available resource to transmit the (N)SCI-CI after detecting the occurrence of a (N)SCI-CI message triggering event (e.g., after identifying one or more skipped transmissions). For example, in the example of FIG. 8, it may be beneficial for the transmitting sidelink UE to include the (N)SCI-CI 850 with the fifth retransmission 820e.

Accordingly, the transmitting sidelink UE may be configured to transmit a (N)SCI-CI 850 when appropriate (e.g., after detecting an occurrence of a (N)SCI-CI message triggering event). That is, after detecting a (N)SCI-CI message triggering event, the transmitting sidelink UE may use the next available resource to transmit the (N)SCI-CI.

Additionally, it may be beneficial to configure the receiving sidelink UE to monitor for messages including (N)SCI-CI. For example, the receiving sidelink UE may be configured to perform blind decoding of the retransmissions 820a-820e to identify the presence of the (N)SCI-CI.

Although the above example includes transmitting SCI (and/or NSCI) with the initial messages 810, 830 and foregoing including SCI (and/or NSCI) with the retransmissions 820a-820e, 840, it may be appreciated that in other examples, the transmitting sidelink UE may be configured to include SCI (and/or NSCI) and/or may be configured to exclude SCI (and/or NSCI) for additional or alternate types of messages. For example, the transmitting sidelink UE may include SCI (and/or NSCI) for every other message regardless of whether the message is an initial message or a retransmission.

In some examples, the transmitting sidelink UE may transmit the (N)SCI-CI at a cancelation indication monitoring occasion. For example, the transmitting sidelink UE and the receiving sidelink UE may negotiate monitoring occasions at which the transmitting sidelink UE may transmit the (N)SCI-CI and the receiving sidelink UE may monitor for the (N)SCI-CI. In some examples, the monitoring occasions may be configured in terms of "within grant." For example, the monitoring occasions may be scheduled to overlap with the retransmissions 820a-820e. In some examples, the monitoring occasions may be scheduled with a pattern (e.g., every other retransmission, etc.). In some examples, the monitoring occasions may be scheduled so that at least one (N)SCI-CI message is possible after a series of retransmissions. In some examples, the monitoring occasions may be scheduled to be periodic. In some examples, the monitoring occasions may be scheduled to be aperiodic.

In some examples, the (N)SCI-CI may indicate that a previous message is a skipped transmission (e.g., a "backward" indication). For example, in the example of FIG. 8, the (N)SCI-CI 850 indicates that the previous retransmissions 820*c*, 820*d* are skipped transmissions. In some examples, the (N)SCI-CI may indicate a current message or a future message is a skipped transmission. For example, the second initial message 850 may include a (N)SCI-CI 852. The (N)SCI-CI 852 may indicate that the retransmission 840 is a skipped transmission. In some such examples, the transmitting sidelink UE may transmit the (N)SCI-CI 852 before the message of the skipped transmission.

In some examples, if the transmitting sidelink UE transmits an NSCI-CI, then the control portion of the message (e.g., the PSCCH) may be rate-matched around the data portion of the message (e.g., the PSSCH). For example, since the NSCI occupies a portion of the resources available for a message, then the resources available for the data portion are reduced. As a result, the transmitting sidelink UE may perform a rate-matching procedure around the NSCI-CI to adjust for the data portion.

In some examples, the transmitting sidelink UE may transmit a cancelation indication without transmitting SCI (and/or NSCI). For example, the transmitting sidelink UE may transmit the cancelation indication via a data channel (e.g., the PSSCH), the second stage SCI (SCI-2), and/or via RRC signaling. In some examples, the transmitting sidelink UE may transmit the cancelation indication using a multi-stage procedure. For example, the SCI may include an indication that there is a skipped transmission, and the data channel or RRC signaling may provide additional information regarding the skipped transmission. For example, the additional information may include which messages are skipped transmissions, the reason that the message is a skipped transmission (e.g., due to pre-emption of a reserved resource, an interference measurement associated with the reserved resource, collision detection, or congestion control).

Figure 9:
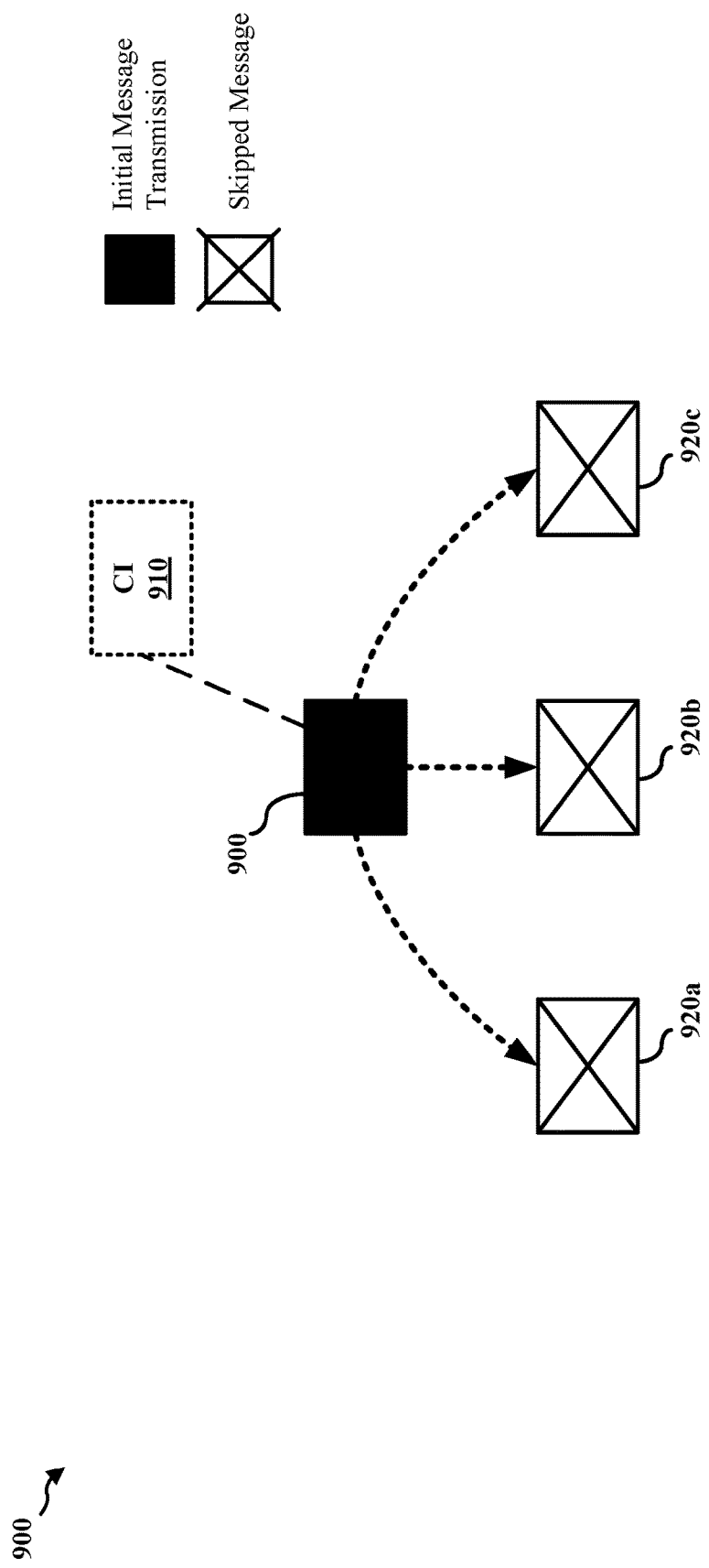
FIG. 9 depicts an example message 900 including an example cancelation indication, in accordance with the teachings disclosed herein.

FIG. 9 depicts an example message 900 including an example cancelation indication 910, as presented herein. The example cancelation indication 910 indicates a skipped transmission. The skipped transmission may be due to pre-emption, interference, collision, congestion control, etc. In some examples, the cancelation indication 910 may include the reason for the skipped transmission (e.g., due to pre-emption of a reserved resource, an interference measurement associated with the reserved resource, collision detection, or congestion control). In some such examples, other devices may be able to reclaim a resource reserved by the transmitting sidelink UE. For example, if the skipped transmission is due to congestion control (e.g., the transmitting sidelink UE determines that it is transmitting a high amount of traffic), another UE that receives the cancelation indication may use the previously reserved resource to transmit a message (e.g., a sidelink transmission).

As shown in FIG. 9, a skipped transmission may be associated with a past message (e.g., a first retransmission 920*a*), may be associated with a current message (e.g., a second retransmission 920*b*), or may be associated with a future message (e.g., a third retransmission 920*c*).

In some examples, the transmitting sidelink UE may perform sensing to identify one or more resources available for transmitting the cancelation indication 910. The transmitting sidelink UE may transmit the cancelation indication 910 using a sensed resource. In some examples, the transmitting sidelink UE may use the sensed resource to transmit the cancelation indication 910 with data traffic. For example, the cancelation indication 910 and the data traffic may occupy multiple subchannels of the sensed resource. In some examples, the transmitting sidelink UE may use the sensed resource to transmit the cancelation indication 910 and forego, or otherwise skip, transmitting data traffic. In some examples in which the transmitting sidelink UE foregoes transmitting data traffic, the transmitting sidelink UE may use a subset of resources to transmit the cancelation indication 910. For example, the transmitting sidelink UE may use one subchannel of the sensed resource to transmit the cancelation indication 910.

In some examples, the receiving sidelink UE may be configured to transmit feedback related to the cancelation indication 910. For example, the receiving sidelink UE may transmit an acknowledgment (ACK) that is received by the transmitting sidelink UE when the receiving sidelink UE receives the cancelation indication 910. In some examples, if the transmitting sidelink UE does not receive an ACK corresponding to the cancelation indication 910 (or receives a negative ACK (NACK)), the transmitting sidelink UE may retransmit the cancelation indication 910.

Figure 10:
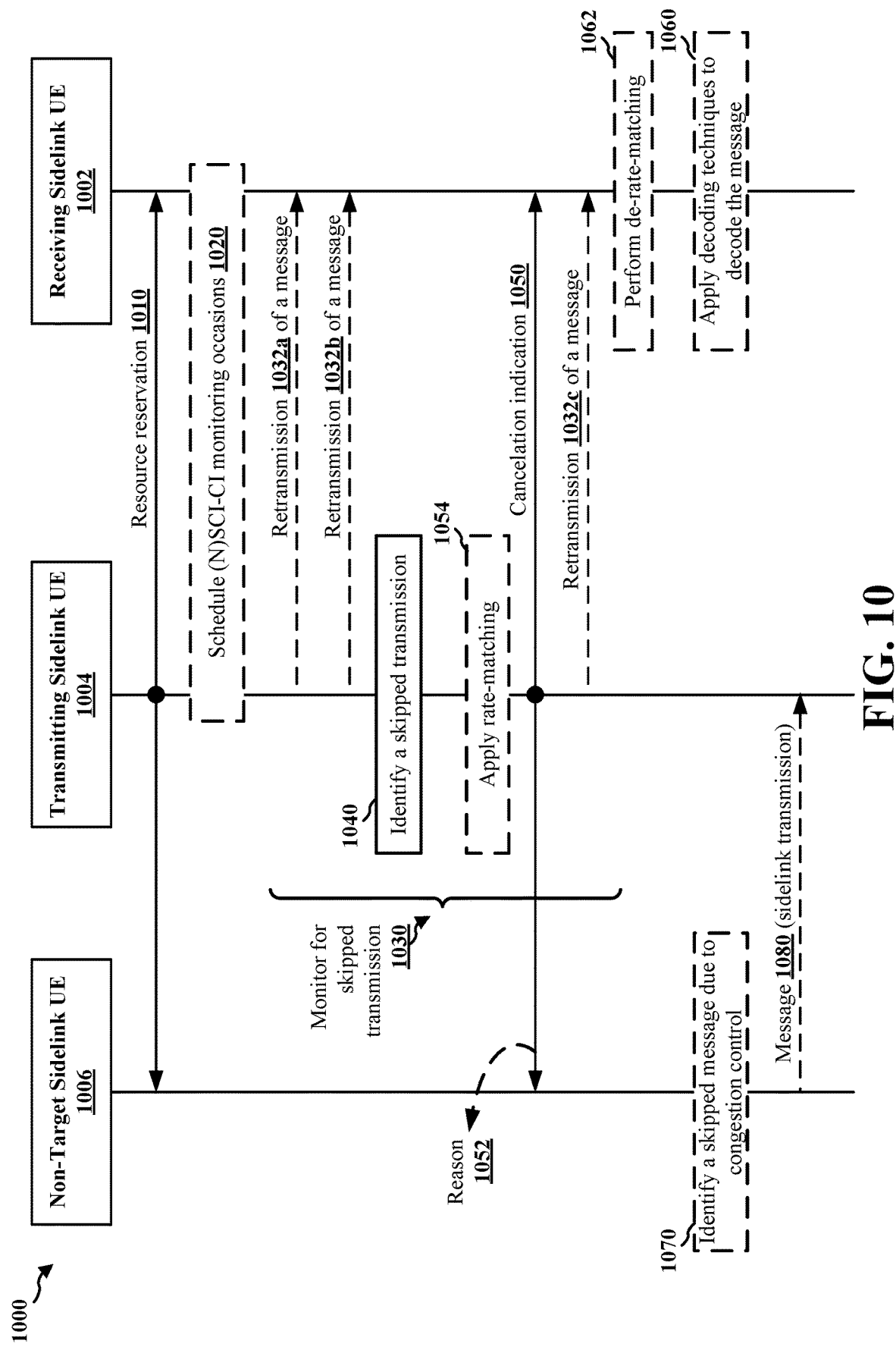
FIG. 10 is an example communication flow between a first sidelink device and a second sidelink device, in accordance with the teachings disclosed herein.

FIG. 10 illustrates an example communication flow 1000 between a transmitting sidelink UE 1004, a receiving sidelink UE 1002, and a non-target sidelink UE 1006, as presented herein. In the illustrated example, the communication flow 1000 facilitates improving decoding of messages (e.g., sidelink transmissions) at a receiving sidelink UE by enabling the transmitting sidelink UE to indicate a skipped transmission. Aspects of the sidelink UEs 1002, 1004, 1006 may be implemented by the UE 104 of FIG. 1 and/or the communication devices 310, 350 of FIG. 3. Although not shown in the illustrated example of FIG. 10, it may be appreciated that in additional or alternative examples, one or more of the sidelink UEs 1002, 1004, 1006 may be in communication with one or more other base stations or UEs.

In the illustrated example, the transmitting sidelink UE 1004 transmits a resource reservation 1010 including resource reservations for retransmissions. The resource reservation 1010 is received by the receiving sidelink UE 1002. In some examples, the resource reservation 1010 may be included in a CE message, such as the example CE messages 720, 740 of FIG. 7. In some examples, the resource reservation 1010 may be included in a non-CE message, such as the example first message 710 of FIG. 7. The transmitting sidelink UE 1004 may transmit the resource reservation using SCI and/or NSCI.

The resource reservation 1010 may reserve a set of resources for retransmission(s) of a message. For example, and referring to the example of FIG. 5, the resource reservation 1010 may be included in SCI (and/or NSCI) of the first message at the first resource 510 (e.g., the slot i). The resource reservation 1010 may reserve future resources, such as the example first future resource 512 (e.g., the slot i+x) for a first retransmission and the example second future resource 514 (e.g., the slot i+y) for a second retransmission. In the illustrated example of FIG. 10, the resource reservation 1010 reserves resources associated with at least a first retransmission 1032*a* of a message, a second retransmission 1032*b* of the message, and a third retransmission 1032*c* of the message.

At 1030, the transmitting sidelink UE 1004 monitors for an occurrence of a skipped transmission. For example, the transmitting sidelink UE 1004 may monitor the resources associated with the retransmissions 1032*a*-1032*c* to identify a skipped transmission. The skipped transmission may be due to, for example, pre-emption of a reserved resource, an interference measurement associated with the reserved resource, collision detection, or congestion control.

At 1040, the transmitting sidelink UE 1004 identifies a skipped transmission. The skipped transmission may be due to, for example, pre-emption of a reserved resource, an interference measurement associated with the reserved resource, collision detection, or congestion control. In some examples, the skipped transmission may correspond to a past retransmission, such as the example first retransmission 920*a* of FIG. 9. In some examples, the skipped transmission may correspond to a current retransmission, such as the example second retransmission 920*b* of FIG. 9. In some examples, the skipped transmission may correspond to a future retransmission, such as the example third retransmission 920*c* of FIG. 9.

In some examples, the transmitting sidelink UE 1004 may receive an indication of a skipped transmission from a base station. For example, in a centralized resource allocation mechanism ("Mode 1"), the transmitting sidelink UE 1004 may receive the indication of the skipped transmission from a base station. The indication may comprise, or otherwise indicate, a cancelation indication. The transmitting sidelink UE 10004 may receive the indication from the base station via an access link (e.g., a Uu interface). For example, the transmitting sidelink UE 1004 may receive the cancelation indication via one or more of DCI, a MAC-CE, and/or RRC signaling.

In the illustrated example, the transmitting sidelink UE 1004 transmits a cancelation indication 1050 that is received by the receiving sidelink UE 1002. The transmitting sidelink UE 1004 transmits the cancelation indication 1050 after identifying the skipped transmission (e.g., at 1040). The cancelation indication 1050 indicates the skipped transmission. The cancelation indication 1050 may indicate the skipped transmission by identifying a quantity of skipped transmissions. In some examples, the cancelation indication 1050 may indicate the skipped transmission by including a bitmap within a window.

In some examples, the cancelation indication 1050 may comprise, or otherwise indicate, an identifier of a retransmission corresponding to the skipped transmission. In some examples, the cancelation indication 1050 may comprise, or otherwise indicate, an identifier of the reserved resource corresponding to the skipped transmission. In some examples, the cancelation indication 1050 may comprise, or otherwise indicate, a reason 1052 for the skipped transmission. For example, the reason 1052 may indicate that the transmitting sidelink UE 1004 identified the skipped transmission due to, for example, pre-emption of a reserved resource, an interference measurement associated with the reserved resource, collision detection, or congestion control.

The transmitting sidelink UE 1004 may transmit the cancelation indication 1050 using SCI (and/or NSCI). In some examples, the transmitting sidelink UE 1004 may transmit the cancelation indication 1050 using a data channel (e.g., PSSCH). In some examples, the transmitting sidelink UE 1004 may transmit the cancelation indication 1050 using RRC signaling. In some examples, the transmitting sidelink UE 1004 may transmit the cancelation indication 1050 using a multi-stage procedure. For example, the transmitting sidelink UE 1004 may transmit a first portion of the cancelation indication 1050 using SCI-1 (and/or NSCI-1) and may transmit a second portion of the cancelation indication 1050 using SCI-2, a data channel, or via RRC signaling. In some examples, the first portion of the cancelation indication 1050 may comprise an indication that the transmitting sidelink UE 1004 identified a skipped transmission, an indication of the retransmission(s) corresponding to the skipped transmission, and/or an indication of the resource(s) corresponding to the skipped transmission. The second portion of the cancelation indication 1050 may comprise additional information about the skipped transmission, such as a reason for the skipped transmission and/or measurements (e.g., an interference measurement) associated with the skipped transmission.

At 1060, the receiving sidelink UE 1002 applies decoding techniques to decode the message. In some examples, the receiving sidelink UE 1002 may apply soft-combining to attempt to decode the message. For example, the receiving sidelink UE 1002 may accumulate the signals associated with an initial message of the message and the one or more retransmissions of the message to decode the message.

As described above, performing soft-combining and using a signal from a retransmission corresponding to a skipped transmission may degrade the quality of the decoding. Accordingly, the receiving sidelink UE 1002 excludes signals associated with the skipped transmission, as indicated by the cancelation indication 1050, when applying the decoding techniques. In some examples, the receiving sidelink UE 1002 may accumulate the signals from messages received during a super slot that are not associated with a skipped transmission. For example, and referring to the example of FIG. 7, the receiving sidelink UE 1002 may perform soft-combining by accumulating the signals associated with the first CE message 720 and the retransmissions 730, 732, 734, 738, while excluding the signals associated with the fourth retransmission 736.

In some examples, the cancelation indication 1050 may comprise one or more bits indicating a quantity of skipped transmissions. For example, and referring to the example of FIG. 8, the cancelation indication (e.g., the (N)SCI-CI 850) may indicate that there are two skipped transmissions.

In some examples, the cancelation indication 1050 may comprise a bitmap, for example, within a window. For example, and referring to the example of FIG. 8, the cancelation indication may (e.g., the (N)SCI-CI 850) may comprise six bits and where each bit corresponds to a respective one of the first initial message 810 and the five retransmissions 820*a*-820*e*. Based on the bitmap, the receiving sidelink UE 1002 may discard the respective retransmissions (e.g., the retransmissions 820*c*, 820*d* of FIG. 8) when applying decoding techniques (e.g., at 1060).

In some examples, the transmitting sidelink UE 1004 may transmit the cancelation indication 1050 using NSCI. In such examples, the control portion of the message (e.g., the PSCCH) may be rate-matched around the data portion of the message (e.g., the PSSCH). For example, since the NSCI occupies a portion of the resources available for a message, then the resources available for the data portion are reduced. As a result, the transmitting sidelink UE 1004 may perform rate-matching 1054 around the NSCI-CI to adjust for the data portion when generating the message. In such examples, the receiving sidelink UE 1002 may perform de-rate-matching 1062 around the cancelation indication 1050 to facilitate decoding the message.

In some examples, the transmitting sidelink UE 1004 transits the cancelation indication 1050 using a reserved resource (e.g., "within grant"). For example, the set of resources reserved by the resource reservation 1010 may include resources associated with the retransmissions 1032a-1032c and another resource associated with a fourth retransmission that occurs before the third retransmission 1032c in the time domain. The transmitting sidelink UE 1004 may identify the skipped transmission (e.g., at 1040) after transmitting the first retransmission 1032a and the second retransmission 1032b. The transmitting sidelink UE 1004 may use the next available resource (e.g., the resource associated with the fourth retransmission) to transmit the cancelation indication 1050. Using the next available resource may be beneficial when the cancelation indication 1050 comprises, or otherwise indicates, a quantity of skipped transmissions. For example, the receiving sidelink UE 1002 may use when the cancelation indication 1050 is received and the quantity of indicated skipped transmissions to determine which messages to discard when performing soft-combining.

In some examples, the transmitting sidelink UE 1004 may be configured to be capable of transmitting the cancelation indication 1050 after identifying the skipped transmission (e.g., at 1040). For example, the transmitting sidelink UE 1004 may be configured to transmit the cancelation indication 1050 after detecting the occurrence of a cancelation indication message triggering event.

In some examples, the receiving sidelink UE 1002 may be configured to be capable of monitoring for messages of the cancelation indication 1050. For example, the receiving sidelink UE 1002 may be configured to perform blind-decoding of a received message to determine whether the receiving message includes a cancelation indication.

In some examples, the transmitting sidelink UE 1004 and the receiving sidelink UE 1002 may negotiate cancelation indication monitoring occasions. For example, at 1020, the transmitting sidelink UE 1004 and the receiving sidelink UE 1002 schedule (N)SCI-CI monitoring occasions 1020.

In some examples, the cancelation indication monitoring occasions may be configured such that a cancelation indication may occur after one or more retransmissions. In some examples, the cancelation indication monitoring occasions may be configured in terms of "within grant." In some examples, the cancelation indication monitoring occasions may be configured to be periodic.

In some examples, a message may be received by one or more intendent recipient sidelink devices and/or non-intended recipient sidelink devices. For example, the transmitting sidelink UE 1004 may transmit the resource reservation 1010 that is intended for the receiving sidelink UE 1002. However, the resource reservation 1010 may also be received by the non-target sidelink UE 1006. For example, the resource reservation 1010 may be received by UEs within a range (e.g., the range 401 of FIG. 4) of the transmitting sidelink UE 1004. In some such examples, the non-target sidelink UE 1006 may be capable of reclaiming a resource that was previously reserved, such as one or more of the resources reserved by the transmitting sidelink UE 1004 via the resource reservation 1010.

For example, the non-target sidelink UE 1006 may receive the cancelation indication 1050 from the transmitting sidelink UE 1004. The cancelation indication 1050 may include the reason 1052 indicating the reason for the skipped transmission. In some such examples, the non-target sidelink UE 1006 may identify, at 1070, a skipped transmission due to congestion control. For example, the transmitting sidelink UE 1004 may be transmitting a high volume of traffic and, thus, may need to back-off. In some such examples, the non-target sidelink UE 1006 may reclaim the resource associated with the skipped transmission. For example, the non-target sidelink UE 1006 may transmit a message 1080 using the resource associated with the skipped transmission. In the illustrated example of FIG. 10, the non-target sidelink UE 1006 transmits the message 1080 that is received by the transmitting sidelink UE 1004. However, in other examples, the non-target sidelink UE 1006 may transmit the message 1080 to one or more additional or alternative devices, such as the receiving sidelink UE 1002.

Figure 11:
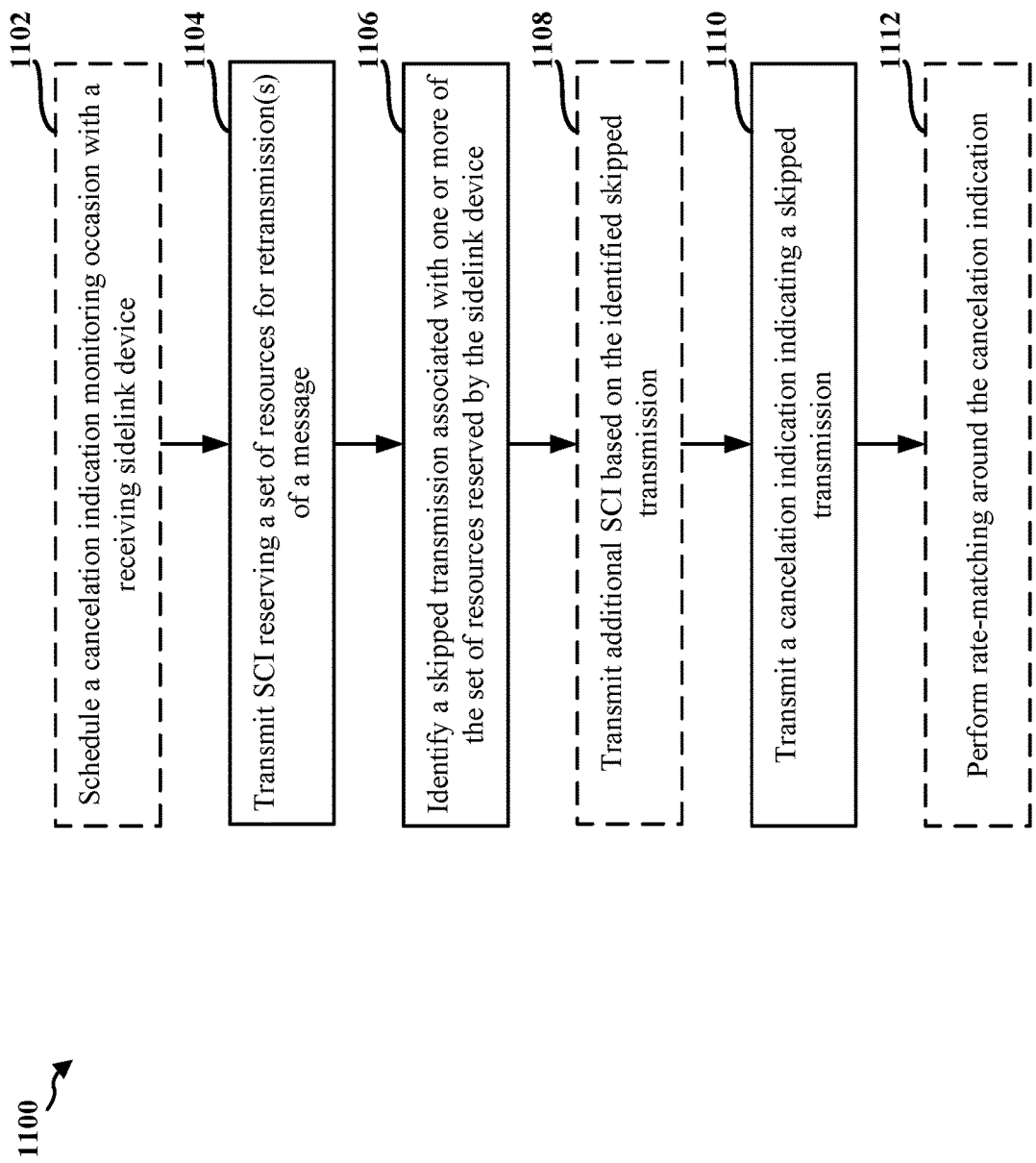
FIG. 11 is a flowchart of a method of wireless communication at a sidelink device, in accordance with the teachings disclosed herein.

FIG. 11 is a flowchart 1100 of a method of wireless communication. The method may be performed by a sidelink device such as a UE or another device communicating based on sidelink (e.g., the UE 104, the transmitting sidelink UE 1004; the apparatus 1302). Optional aspects are illustrated with a dashed line. The method may improve reception at a receiving sidelink device and/or may provide a more efficient use of wireless resources.

At 1104, the sidelink device transmits SCI reserving a set of resources for one or more retransmissions of a message (e.g., a sidelink transmission), the set of resources identifying one or more reserved resources in a time domain. The transmission of the SCI may be performed, for example, by an SCI component 1340 via a transmission component 1334 of the apparatus 1302 in FIG. 13. In some examples, the SCI may correspond to an NSCI that may be used for coverage extension (e.g., in a coverage extension message).

At 1106, the sidelink device identifies a skipped transmission associated with one or more of the set of resources reserved by the sidelink device. The identification of the skipped transmission may be performed, for example, by a skipped transmission component 1342 of the apparatus 1302 in FIG. 13. The sidelink device may identify the skipped transmission based on pre-emption of a reserved resource. The sidelink device may identify the skipped transmission based on an interference measurement associated with the reserved resource. The sidelink device may identify the skipped transmission based on collision detection. The sidelink device may identify the skipped transmission based on congestion control.

At 1110, the sidelink device transmits a cancelation indication indicating the skipped transmission. The transmission of the cancelation indication may be performed by, for example, a cancelation indication component 1344 via the transmission component 1334 of the apparatus 1302 of FIG. 13. The cancelation indication may indicate that the skipped transmission corresponds to a previous reserved resource in the time domain (e.g., the reserved resource associated with the first retransmission 920a of FIG. 9). The cancelation indication may indicate that the skipped transmission corresponds to a current reserved resource in the time domain (e.g., the reserved resource associated with the second retransmission 920b of FIG. 9). The cancelation indication may indicate that the skipped transmission corresponds to a future reserved resource in the time domain (e.g., the reserved resource associated with the third retransmission 920c of FIG. 9). The cancelation indication may comprise, or otherwise indicate, a reason for the skipped transmission. The sidelink device may transmit the cancelation indication using one or more of an additional SCI, a data channel, and radio resource control signaling. The cancelation indication may indicate that the skipped transmission comprises a quantity of reserved resources. The cancelation indication may comprise a bitmap, e.g., to inform receiving devices of the skipped transmission.

In some examples, the sidelink device may identify, at 1106, the skipped transmission before transmitting a retransmission of the message using a corresponding reserved resource of the set of resources, as described in connection with the second initial message 830 of FIG. 8. The sidelink device may transmit, at 1110, the cancelation indication indicating that the corresponding reserved resource corresponds to the current reserved resource in the time domain or to the future reserved resource in the time domain, as described in connection with the (N)SCI-CI 852 of FIG. 8 and/or the cancelation indication 910 of FIG. 9.

In some examples, the sidelink device may identify, at 1106, the skipped transmission after transmitting a retransmission of the message using a corresponding reserved resource of the set of resources, as described in connection with the first initial message 810 of FIG. 8. The sidelink device may transmit, at 1110, the cancelation indication indicating that the corresponding reserved resource corresponds to the previous reserved resource in the time domain, as described in connection with the (N)SCI-CI 850 of FIG. 8.

The sidelink device may transmit the cancelation indication to a receiving sidelink device at a cancelation indication monitoring occasion. As illustrated at 1102, the sidelink device may schedule the cancelation indication monitoring occasion with the receiving sidelink device, the cancelation indication monitoring occasion comprising one or more time domain resources. The scheduling of the cancelation indication monitoring occasion may be performed, for example, by a schedule component 1346 of the apparatus 1302 in FIG. 13. The sidelink device may then transmit the cancelation indication, at 1110, using at least one resource of the one or more time domain resources.

In some examples, the sidelink device may transmit an additional SCI, at 1108, and the cancelation indication, at 1110, using a reserved resource of the set of resources. In some examples, the sidelink device may transmit the additional SCI based on identifying the skipped transmission. The transmission of the additional SCI may be performed, for example, by the SCI component 1340 via the transmission component 1334 of the apparatus 1302 in FIG. 13. In some examples, the additional SCI may correspond to an NSCI that may be used for coverage extension (e.g., in a coverage extension message).

As illustrated, at 1102, the sidelink device may schedule a cancelation indication monitoring occasion with a receiving sidelink device. The scheduling may be performed, for example, the schedule component 1346 of the apparatus 1302 of FIG. 13. Then, the sidelink device may transmit the additional SCI, at 1108, and the cancelation indication, at 1110, to the receiving sidelink device at (e.g., during) the cancelation indication monitoring occasion. The cancelation indication monitoring occasion may comprise one or more resources in the time domain, and the sidelink device may transmit the additional SCI, at 1108, and the cancelation indication, at 1110, using at least one resource of the one or more resources in the time domain. The cancelation indication monitoring occasion may overlap with at least one reserved resource of the set of resources, as described in connection with the fifth retransmission 820e of FIG. 8. The cancelation indication monitoring occasion may be periodic.

As illustrated at 1112, the sidelink device may perform rate-matching around the cancelation indication. The rate-matching may be performed, for example, by a rate-match component 1348 of the apparatus 1302 of FIG. 13. For example, when the sidelink device transmits NSCI-CI, then the control portion of the message (e.g., the PSCCH) may be rate-matched around the data portion of the message (e.g., the PSSCH). For example, since the NSCI occupies a portion of the resources available for a message, then the resources available for the data portion are reduced. As a result, the sidelink device may perform a rate-matching procedure around the NSCI-CI to adjust for the data portion.

Figure 12:
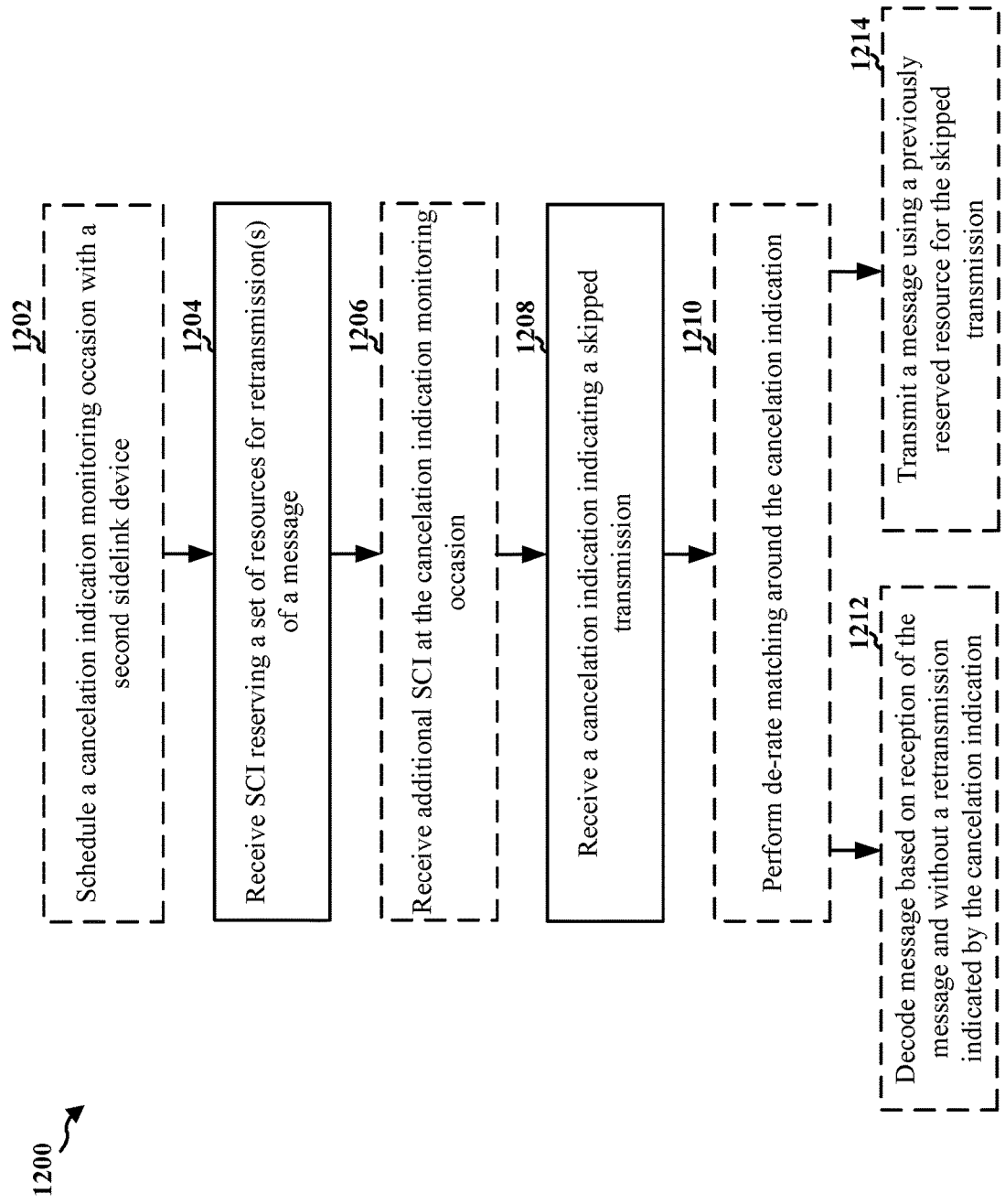
FIG. 12 is a flowchart of a method of wireless communication at a first sidelink device, in accordance with the teachings disclosed herein.

FIG. 12 is a flowchart 1200 of a method of wireless communication. The method may be performed by a first sidelink device such as a UE or another device communicating based on sidelink (e.g., the UE 104, the receiving sidelink UE 1002, the non-target sidelink UE 1006; the apparatus 1302). Optional aspects are illustrated with a dashed line. The method may improve reception at the first sidelink device and/or may provide a more efficient use of wireless resources.

At 1204, the first sidelink device receives from a second sidelink device, SCI reserving a set of resources for retransmissions of a message, the set of resources identifying one or more reserved resources in a time domain. The reception of the SCI may be performed, for example, by an SCI component 1340 via a reception component 1330 of the apparatus 1302 in FIG. 13. In some examples, the SCI may correspond to an NSCI that may be used for coverage extension (e.g., in a coverage extension message).

At 1208, the first sidelink device receives, from the second sidelink device, a cancelation indication indicating a skipped transmission. The reception of the cancelation indication may be performed, for example, by a cancelation indication component 1344 via the reception component 1330 of the apparatus 1302 in FIG. 13. The cancelation indication may indicate that the skipped transmission corresponds to a previous reserved resource in the time domain. The cancelation indication may indicate that the skipped transmission corresponds to a current reserved resource in the time domain. The cancelation indication may indicate that the skipped transmission corresponds to a future reserved resource in the time domain. The first sidelink device may receive the cancelation indication via one or more of an additional SCI, a data channel, and radio resource control signaling. The cancelation indication may indicate that the skipped transmission comprises a quantity of reserved resources. The cancelation indication may comprise a bitmap, e.g., to inform receiving devices of the skipped transmission. The first sidelink device may determine, from the bitmap, the previously reserved resources that are associated with the skipped transmission and forego using the respective retransmissions when decoding a message.

The first sidelink device may receive the cancelation indication from the second sidelink device at a cancelation indication monitoring occasion. The cancelation indication may comprise, or otherwise indicate, a reason for the skipped transmission. As illustrated at 1202, the first sidelink device may schedule the cancelation indication monitoring occasion with the second sidelink device, the cancelation indication monitoring occasion comprising one or more resources in the time domain. The scheduling of the cancelation indication monitoring occasion may be performed, for example, by the schedule component 1346 of the apparatus 1302 in FIG. 13. The first sidelink device may then receive the cancelation indication, at 1208, via at least one resource of the one or more resources in the time domain.

As illustrated at 1212, the first sidelink device may decode the message based on reception of the message and without at least one retransmission of the message indicated by the cancelation indication. The decoding may be performed, for example, by the decoder component 1350 of the apparatus 1302 in FIG. 13. For example, if the first sidelink device was a recipient of the message, e.g., an intended recipient of the sidelink message, the first sidelink device may use the cancelation indication to determine to decode the message without using the retransmission indicated by the cancelation indication. For example, the first sidelink device may forego using a received retransmission corresponding to the skipped transmission indicated via the cancelation indication when decoding the message.

The first sidelink device may receive an additional SCI, at 1206, and the cancelation indication, at 1208, from the second sidelink device via a reserved resource of the set of resources. The first sidelink device may monitor for the additional SCI and the cancelation indication using blind decoding techniques at the reserved resources of the set of resources. The reception of the additional SCI may be performed, for example, by the SCI component 1340 via the reception component 1330 of the apparatus 1302 in FIG. 13. In some examples, the additional SCI may correspond to an NSCI that may be used for coverage extension (e.g., in a coverage extension message).

As illustrated, at 1202, the first sidelink device may schedule a cancelation indication monitoring occasion with the second sidelink device. The scheduling may be performed by the schedule component 1346 of the apparatus 1302 in FIG. 13. Then, the first sidelink device may receive the additional SCI, at 1206, and the cancelation indication, at 1208, from the second sidelink device at (e.g., during) the cancelation indication monitoring occasion. The cancelation indication monitoring occasion may comprise one or more resources in the time domain, and the first sidelink device may receive the additional SCI, at 1206, and the cancelation indication, at 1208, via at least one resource of the one or more resources in the time domain. The cancelation indication monitoring occasion may overlap with at least one reserved resource of the set of resources. The cancelation indication monitoring occasion may be periodic.

As illustrated at 1210, the first sidelink device may perform de-rate-matching around the cancelation indication from the second sidelink device. The de-rate matching may be performed, for example, by the rate-match component 1348 of the apparatus 1302 in FIG. 13. For example, the device transmitting the cancelation indication may rate-match around the cancelation indication when generating the message, and the first sidelink device may perform a corresponding de-rate matching to account for the inclusion of the cancelation indication in the message.

As illustrated at 1214, the first sidelink device may transmit a message (e.g., a sidelink transmission) using a previously reserved resource associated with the skipped transmission. The transmission of the message may be performed, for example, by the transmission component 1334 of the apparatus 1302 in FIG. 13. Thus, the first sidelink device may use the cancelation indication to determine that previously reserved resources have become available and may reuse the resources for its own transmission of a message. In some aspects, the first sidelink device may not be an intended recipient of the message or retransmission, and may have instead been using the SCI reserving the resources for the purpose of sidelink resource allocation, e.g., under resource allocation mode 2.

Figure 13:
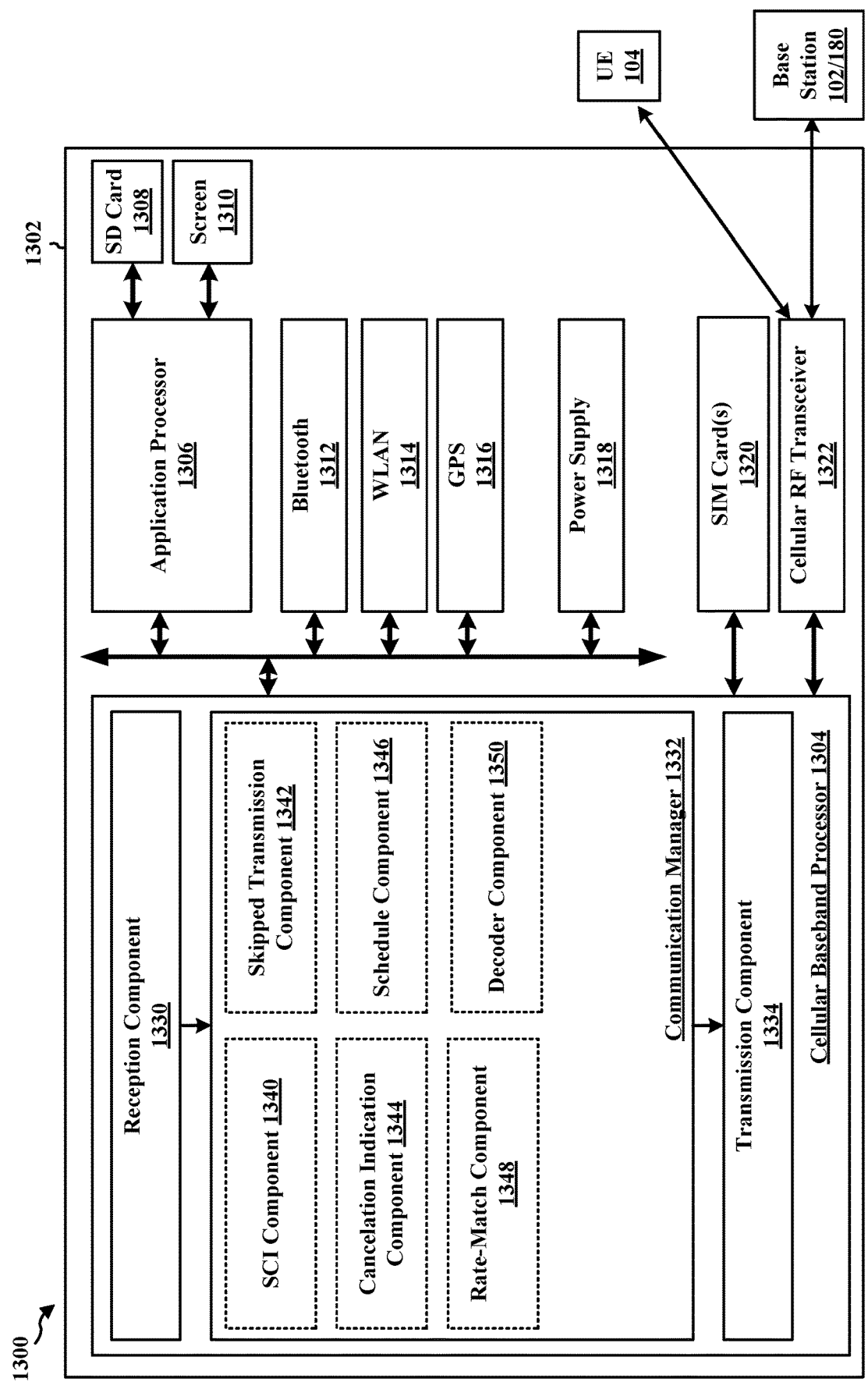
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 is a sidelink device, such as a UE or another device communicating based on sidelink. The apparatus 1302 includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304.

The cellular baseband processor 1304 may be a component of the second communication device 350 and may include the memory 360 and/or at least one of the TX processor 368, the RX processor 356, and the controller/processor 359. In another configuration, the cellular baseband processor 1304 may be a component of the first communication device 310 and may include the memory 376 and/or at least one of the TX processor 316, the RX processor 370, and the controller/processor 375. In one configuration, the apparatus 1302 may be a modem chip and include just the cellular baseband processor 1304, and in another configuration, the apparatus 1302 may be the entire sidelink device (e.g., see the first communication device 310 or the second communication device 350 of FIG. 3) and include the additional modules of the apparatus 1302.

The communication manager 1332 includes an SCI component 1340 that is configured to transmit SCI reserving a set of resources for one or more retransmissions of a message, the set of resources identifying one or more reserved resources in a time domain, for example, as described in connection with 1104 of FIG. 11. The SCI component 1340 may be further configured to transmit an additional SCI, for example, as described in connection with 1108 of FIG. 11. The SCI component 1340 may be further configured to receive from a second sidelink device, SCI reserving a set of resources for retransmissions of a message, the set of resources identifying one or more reserved resources in a time domain, for example, as described in connection with 1204 of FIG. 12. The SCI component 1340 may be further configured to receive an additional SCI, for example, as described in connection with 1206 of FIG. 12.

The communication manager 1332 also includes a skipped transmission component 1342 that is configured to identify a skipped transmission associated with one or more of the set of resources reserved by the sidelink device, for example, as described in connection with 1106 of FIG. 11.

The communication manager 1332 also includes a cancelation indication component 1344 that is configured to transmit a cancelation indication indicating the skipped transmission, for example, as described in connection with 1110 of FIG. 11. The cancelation indication component 1344 may be further configured to receive, from the second sidelink device, a cancelation indication indicating a skipped transmission, for example, as described in connection with 1208 of FIG. 12.

The communication manager 1332 also includes a schedule component 1346 that is configured to schedule the cancelation indication monitoring occasion with the receiving sidelink device, for example, as described in connection with 1102 of FIG. 11. The schedule component 1346 may be further configured to schedule a cancelation indication monitoring occasion with the second sidelink device, for example, as described in connection with 1202 of FIG. 12.

The communication manager 1332 also includes a rate-match component 1348 that is configured to perform rate-matching around the cancelation indication, for example, as described in connection with 1112 of FIG. 11. The rate-match component 1348 may be further configured to perform de-rate-matching around the cancelation indication from the second sidelink device, for example, as described in connection with 1210 of FIG. 12.

The communication manager 1332 also includes a decoder component 1350 that is configured to decode the message based on reception of the message and without at least one retransmission of the message indicated by the cancelation indication, for example, as described in connection with 1212 of FIG. 12.

The apparatus 1302 may further include a transmission component 1334 configured to transmit a message (e.g., a sidelink transmission) using a previously reserved resource for the skipped transmission, for example, as described in connection with 1214 of FIG. 12.

The apparatus may include additional components that perform each of the blocks of the algorithm in the aforementioned flowcharts of FIGS. 11 and/or 12. As such, each block in the aforementioned flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for transmitting SCI reserving a set of resources for one or more retransmissions of a message, the set of resources identifying one or more reserved resources in a time domain. The example apparatus 1302 also includes means for identifying a skipped transmission associated with one or more of the set of resources reserved by the sidelink device. The example apparatus 1302 also includes means for transmitting a cancelation indication indicating the skipped transmission, the cancelation indication indicating that the skipped transmission corresponds to a previous reserved resource in the time domain, a current reserved resource in the time domain, or a future reserved resource in the time domain.

In another configuration, the example apparatus 1302 also includes means for transmitting the cancelation indication using one or more of an additional SCI message, a data channel, and radio resource control signaling.

In another configuration, the example apparatus 1302 also includes means for identifying the skipped transmission based on pre-emption of a reserved resource, an interference measurement associated with the reserved resource, collision detection, or congestion control. The example apparatus 1302 also includes means for indicating, via the cancelation indication, that the corresponding reserved resource corresponds to the current reserved resource in the time domain or the future reserved resource in the time domain.

In another configuration, the example apparatus 1302 also includes means for identifying the skipped transmission before transmitting a retransmission of the message using a corresponding reserved resource of the set of resources. The example apparatus 1302 also includes means for indicating, via the cancelation indication, that the corresponding reserved resource corresponds to the previous reserved resource in the time domain.

In another configuration, the example apparatus 1302 also includes means for identifying the skipped transmission after transmitting a retransmission of the message using a corresponding reserved resource of the set of resources. The example apparatus 1302 also includes means for transmitting the additional SCI and the cancelation indication based on identifying the skipped transmission. The example apparatus 1302 also includes means for scheduling a cancelation indication monitoring occasion with a receiving sidelink device. The example apparatus 1302 also includes means for transmitting the additional SCI and the cancelation indication to the receiving sidelink device at the cancelation indication monitoring occasion.

In another configuration, the example apparatus 1302 also includes means for performing rate-matching around the cancelation indication.

In another configuration, the example apparatus 1302 also includes means for transmitting the cancelation indication during a cancelation indication monitoring occasion. The example apparatus 1302 also includes means for indication, via the cancelation indication, a reason for the skipped transmission.

In another configuration, the example apparatus 1302 also includes means for scheduling the cancelation indication monitoring occasion with a receiving sidelink device, the cancelation indication monitoring occasion comprising one or more time domain resources. The example apparatus 1302 also includes means for transmitting the cancelation indication using at least one resource of the one or more time domain resources.

In another configuration, the example apparatus 1302 also includes means for receiving the cancelation indication from a base station via at least one of DCI, a MAC-CE, or RRC signaling.

In another configuration, the example apparatus 1302 also includes means for receiving, from a second sidelink device, SCI reserving a set of resources for retransmissions of a message, the set of resources identifying one or more reserved resources in a time domain. The example apparatus 1302 also includes means for receiving, from the second sidelink device, a cancelation indication indicating a skipped transmission, the cancelation indication indicating that the skipped transmission corresponds to a previous reserved resource in the time domain, a current reserved resource in the time domain, or a future reserved resource in the time domain.

In another configuration, the example apparatus 1302 also includes means for decoding the message based on reception of the message and without at least one retransmission of the message indicated by the cancelation indication.

In another configuration, the example apparatus 1302 also includes means for receiving the cancelation indication via one or more of an additional SCI, a data channel, and radio resource control signaling.

In another configuration, the example apparatus 1302 also includes means for receiving an additional SCI and the cancelation indication from the second sidelink device via a reserved resource of the set of resources. The example apparatus 1302 also includes means for monitoring for the additional SCI and the cancelation indication using blind decoding techniques at the reserved resources of the set of resources. The example apparatus 1302 also includes means for scheduling a cancelation indication monitoring occasion with the second sidelink device. The example apparatus 1302 also includes means for receiving the additional SCI and the cancelation indication from the second sidelink device at the cancelation indication monitoring occasion.

In another configuration, the example apparatus 1302 also includes means for performing de-rate-matching around the cancelation indication from the second sidelink device.

In another configuration, the example apparatus 1302 also includes means for receiving the cancelation indication from the second sidelink device at a cancelation indication monitoring occasion.

In another configuration, the example apparatus 1302 also includes means for scheduling the cancelation indication monitoring occasion with the second sidelink device, the cancelation indication monitoring occasion comprising one or more resources in the time domain. The example apparatus 1302 also includes means for receiving the cancelation indication via at least one resource of the one or more resources in the time domain.

In another configuration, the example apparatus 1302 also includes means for transmitting a message using a previously reserved resource for the skipped transmission.

The aforementioned means may be one or more of the aforementioned components of the apparatus 1302 configured to perform the functions recited by the aforementioned means. As described supra, the apparatus 1302 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means. In another configuration, the apparatus 1302 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a sidelink device, comprising: transmitting sidelink control information (SCI) reserving a set of resources for one or more retransmissions of a message, the set of resources identifying one or more reserved resources in a time domain; identifying a skipped transmission associated with one or more of the set of resources reserved by the sidelink device; and transmitting a cancelation indication indicating the skipped transmission, the cancelation indication indicating that the skipped transmission corresponds to a previous reserved resource in the time domain, a current reserved resource in the time domain, or a future reserved resource in the time domain.

In aspect 2, the method of aspect 1 further includes that the sidelink device transmits the cancelation indication using one or more of an additional SCI message, a data channel, and radio resource control signaling.

In aspect 3, the method of aspect 1 or aspect 2 further includes that the sidelink device identifies the skipped transmission based on pre-emption of a reserved resource, an interference measurement associated with the reserved resource, collision detection, or congestion control.

In aspect 4, the method of any of aspects 1-3 further includes that the sidelink device identifies the skipped transmission before transmitting a retransmission of the message using a corresponding reserved resource of the set of resources, and the cancelation indication indicates that the corresponding reserved resource corresponds to the current reserved resource in the time domain or the future reserved resource in the time domain.

In aspect 5, the method of any of aspects 1-4 further includes that the sidelink device identifies the skipped transmission after transmitting a retransmission of the message using a corresponding reserved resource of the set of resources, and the cancelation indication indicates that the corresponding reserved resource corresponds to the previous reserved resource in the time domain.

In aspect 6, the method of any of aspects 1-5 further includes that the sidelink device transmits an additional SCI and the cancelation indication using a reserved resource of the set of resources.

In aspect 7, the method of aspect 6 further includes that the sidelink device transmits the additional SCI and the cancelation indication based on identifying the skipped transmission.

In aspect 8, the method of aspect 7 further includes scheduling a cancelation indication monitoring occasion with a receiving sidelink device; and transmitting the additional SCI and the cancelation indication to the receiving sidelink device at the cancelation indication monitoring occasion.

In aspect 9, the method of aspect 8 further includes that the cancelation indication monitoring occasion comprises one or more resources in the time domain, and the sidelink device transmits the additional SCI and the cancelation indication using at least one resource of the one or more resources in the time domain.

In aspect 10, the method of aspect 8 further includes that the cancelation indication monitoring occasion overlaps with at least one reserved resource of the set of resources.

In aspect 11, the method of aspect 8 further includes that the cancelation indication monitoring occasion is periodic.

In aspect 12, the method of any of aspects 1-11 further includes performing rate-matching around the cancelation indication.

In aspect 13, the method of any of aspects 1-12 further includes that the cancelation indication indicating the skipped transmission comprises a quantity of reserved resources.

In aspect 14, the method of any of aspects 1-13 further includes that the cancelation indication indicating the skipped transmission comprises a bitmap.

In aspect 15, the method of any of aspects 1-14 further includes that the sidelink device transmits the cancelation indication during a cancelation indication monitoring occasion.

In aspect 16, the method of any of aspects 1-15 further includes that the cancelation indication indicates a reason for the skipped transmission.

In aspect 17, the method of any of aspects 1-16 further includes scheduling the cancelation indication monitoring occasion with a receiving sidelink device, the cancelation indication monitoring occasion comprising one or more time domain resources, and wherein the sidelink device transmits the cancelation indication using at least one resource of the one or more time domain resources.

In aspect 18, the method of any of aspects 1-17 further includes that the sidelink device receives the cancelation indication from a base station via at least one of downlink control information (DCI), a medium access control—control element (MAC-CE), or radio resource control (RRC) signaling.

Aspect 19 is an apparatus for wireless communication comprising means to perform the method of any of aspects 1-18.

Aspect 20 is an apparatus for wireless communication comprising a memory and at least one processor coupled to the memory, the memory and at least one processor configured to perform the method of any of aspects 1-18.

Aspect 21 is a non-transitory computer-readable storage medium storing computer executable code, the code when executed by a processor causes the processor to perform the method of any of aspects 1-18.

Aspect 22 is a method of wireless communication of a first sidelink device, comprising: receiving, from a second sidelink device, sidelink control information (SCI) reserving a set of resources for retransmissions of a message, the set of resources identifying one or more reserved resources in a time domain; and receiving, from the second sidelink device, a cancelation indication indicating a skipped transmission, the cancelation indication indicating that the skipped transmission corresponds to a previous reserved resource in the time domain, a current reserved resource in the time domain, or a future reserved resource in the time domain.

In aspect 23, the method of aspect 22 further includes decoding the message based on reception of the message and without at least one retransmission of the message indicated by the cancelation indication.

In aspect 24, the method of aspect 22 or 23 further includes that the first sidelink device receives the cancelation indication via one or more of an additional SCI, a data channel, and radio resource control signaling.

In aspect 25, the method of any of aspects 22-24 further includes that the first sidelink device foregoes using a received retransmission corresponding to the skipped transmission indicated via the cancelation indication when decoding the message.

In aspect 26, the method of any of aspects 22-25 further includes that the first sidelink device receives an additional SCI and the cancelation indication from the second sidelink device via a reserved resource of the set of resources.

In aspect 27, the method of any of aspects 22-26 further includes that the first sidelink device monitors for the additional SCI and the cancelation indication using blind decoding techniques at the reserved resources of the set of resources.

In aspect 28, the method of any of aspects 22-27 further includes scheduling a cancelation indication monitoring occasion with the second sidelink device; and receiving the additional SCI and the cancelation indication from the second sidelink device at the cancelation indication monitoring occasion.

In aspect 29, the method of any of aspects 22-28 further includes that the cancelation indication monitoring occasion comprises one or more resources in the time domain, and the first sidelink device receives the SCI and the cancelation indication via at least one resource of the one or more resources in the time domain.

In aspect 30, the method of aspect 29 further includes that the cancelation indication monitoring occasion overlaps with at least one reserved resource of the set of resources.

In aspect 31, the method of aspect 30 further includes that the cancelation indication monitoring occasion is periodic.

In aspect 32, the method of any of aspects 22-31 further includes that performing de-rate-matching around the cancelation indication from the second sidelink device.

In aspect 33, the method of any of aspects 22-32 further includes that the cancelation indication indicating the skipped transmission comprises a quantity of reserved resources.

In aspect 34, the method of any of aspects 22-33 further includes that the cancelation indication indicating the skipped transmission comprises a bitmap.

In aspect 35, the method of any of aspects 22-34 further includes that the first sidelink device receives the cancelation indication from the second sidelink device at a cancelation indication monitoring occasion.

In aspect 36, the method of any of aspects 22-35 further includes that the cancelation indication comprises a reason for the skipped transmission.

In aspect 37, the method of any of aspects 22-36 further includes that scheduling the cancelation indication monitoring occasion with the second sidelink device, the cancelation indication monitoring occasion comprising one or more resources in the time domain, and wherein the first sidelink device receives the cancelation indication via at least one resource of the one or more resources in the time domain.

In aspect 38, the method of any of aspects 22-37 further includes that transmitting a message using a previously reserved resource for the skipped transmission.

Aspect 39 is an apparatus for wireless communication comprising means to perform the method of any of aspects 22-38.

Aspect 40 is an apparatus for wireless communication comprising a memory and at least one processor coupled to the memory, the memory and at least one processor configured to perform the method of any of aspects 22-38.

Aspect 41 is a non-transitory computer-readable storage medium storing computer executable code, the code when executed by a processor causes the processor to perform the method of any of aspects 22-38.

What is claimed is:

1. An apparatus for wireless communication at a sidelink device, comprising:
at least one memory; and
at least one processor coupled to the at least one memory and configured to cause the sidelink device to:
transmit sidelink control information (SCI) reserving a set of resources for one or more retransmissions of a message, the set of resources identifying one or more reserved resources in a time domain;
identify a skipped transmission associated with one or more of the set of resources reserved by the sidelink device for the one or more retransmissions; and
transmit a cancelation indication including a backward indication indicating the skipped transmission after at least one of the one or more reserved resources has occurred, the cancelation indication indicating that the skipped transmission corresponds to a previous reserved resource that has already occurred in the time domain for the one or more retransmissions.

2. The apparatus of claim 1, wherein the at least one processor is configured to cause the sidelink device to transmit the cancelation indication using one or more of an additional SCI message, a data channel, and radio resource control signaling.

3. The apparatus of claim 1, wherein the at least one processor is configured to cause the sidelink device to identify the skipped transmission based on an interference measurement associated with a reserved resource, collision detection, or congestion control.

4. The apparatus of claim 1, wherein the at least one processor is configured to cause the sidelink device to further identify a second skipped transmission before transmitting a second retransmission of a second message using a corresponding reserved resource of a second set of resources, and transmitting a second cancelation indication that indicates that the corresponding reserved resource corresponds to a current reserved resource in the time domain or a future reserved resource in the time domain.

5. The apparatus of claim 1, wherein the at least one processor is configured to cause the sidelink device to transmit an additional SCI and the cancelation indication using a reserved resource of the set of resources.

6. The apparatus of claim 5, wherein the at least one processor is configured to cause the sidelink device to transmit the additional SCI and the cancelation indication based on identifying the skipped transmission.

7. The apparatus of claim 5, wherein the at least one processor is further configured to cause the sidelink device to:
schedule a cancelation indication monitoring occasion with a receiving sidelink device; and
transmit the additional SCI and the cancelation indication to the receiving sidelink device at the cancelation indication monitoring occasion.

8. The apparatus of claim 7, wherein the cancelation indication monitoring occasion comprises one or more resources in the time domain, and the at least one processor is configured to cause the sidelink device to transmit the additional SCI and the cancelation indication using at least one resource of the one or more resources in the time domain.

9. The apparatus of claim 7, wherein the cancelation indication monitoring occasion overlaps with at least one reserved resource of the set of resources, and the cancelation indication monitoring occasion is periodic.

10. The apparatus of claim 1, wherein the cancelation indication indicating the skipped transmission comprises a quantity of reserved resources, and the cancelation indication indicating the skipped transmission comprises a bitmap.

11. The apparatus of claim 1, wherein the at least one processor is configured to cause the sidelink device to transmit the cancelation indication during a cancelation indication monitoring occasion.

12. The apparatus of claim 11, wherein the cancelation indication indicates a reason for the skipped transmission.

13. The apparatus of claim 11, wherein the at least one processor is further configured to cause the sidelink device to:
schedule the cancelation indication monitoring occasion with a receiving sidelink device, the cancelation indication monitoring occasion comprising one or more time domain resources; and
use at least one resource of the one or more time domain resources to transmit the cancelation indication.

14. The apparatus of claim 1, wherein the at least one processor is configured to cause the sidelink device to receive the cancelation indication from a base station via at least one of downlink control information (DCI), a medium access control—control element (MAC-CE), or radio resource control (RRC) signaling.

15. An apparatus for wireless communication of a first sidelink device, comprising:
at least one memory; and
at least one processor coupled to the at least one memory and configured to cause the first sidelink device to:
receive, from a second sidelink device, sidelink control information (SCI) reserving a set of resources for retransmissions of a message, the set of resources identifying one or more reserved resources in a time domain; and
receive, from the second sidelink device, a cancelation indication including a backward indication indicating a skipped transmission after at least one of the one or more reserved resources has occurred, the cancelation indication indicating that the skipped transmission corresponds to a previous reserved resource that has already occurred in the time domain for the retransmissions.

16. The apparatus of claim 15, wherein the at least one processor is further configured to cause the first sidelink device to:
decode the message based on reception of the message and without at least one retransmission of the message indicated by the cancelation indication.

17. The apparatus of claim 15, wherein the at least one processor is configured to cause the first sidelink device to receive the cancelation indication via one or more of an additional SCI, a data channel, and radio resource control signaling.

18. The apparatus of claim 15, wherein the at least one processor is configured to cause the first sidelink device to forego using a prior retransmission occasion corresponding to the skipped transmission indicated via the cancelation indication when decoding the message.

19. The apparatus of claim 15, wherein the at least one processor is configured to cause the first sidelink device to receive an additional SCI and the cancelation indication from the second sidelink device via a reserved resource of the set of resources.

20. The apparatus of claim 19, wherein the at least one processor is configured to cause the first sidelink device to monitor for the additional SCI and the cancelation indication using blind decoding techniques at the reserved resource of the set of resources.

21. The apparatus of claim 19, wherein the at least one processor is further configured to cause the first sidelink device to:
schedule a cancelation indication monitoring occasion with the second sidelink device; and
receive the additional SCI and the cancelation indication from the second sidelink device at the cancelation indication monitoring occasion.

22. The apparatus of claim 21, wherein the cancelation indication monitoring occasion comprises one or more resources in the time domain, and wherein the at least one processor is configured to cause the first sidelink device to receive the SCI and the cancelation indication via at least one resource of the one or more resources in the time domain.

23. The apparatus of claim 21, wherein the cancelation indication monitoring occasion overlaps with at least one reserved resource of the set of resources, and the cancelation indication monitoring occasion is periodic.

24. The apparatus of claim 19, wherein the at least one processor is further configured to cause the first sidelink device to:
perform de-rate-matching based on the cancelation indication from the second sidelink device.

25. The apparatus of claim 15, wherein the cancelation indication indicating the skipped transmission comprises a quantity of reserved resources, and the cancelation indication indicating the skipped transmission comprises a bitmap.

26. The apparatus of claim 15, wherein the at least one processor is configured to cause the first sidelink device to receive the cancelation indication from the second sidelink device at a cancelation indication monitoring occasion.

27. The apparatus of claim 26, wherein the cancelation indication comprises a reason for the skipped transmission.

28. The apparatus of claim 26, wherein the at least one processor is further configured to cause the first sidelink device to:
schedule the cancelation indication monitoring occasion with the second sidelink device, the cancelation indication monitoring occasion comprising one or more resources in the time domain; and
receive the cancelation indication via at least one resource of the one or more resources in the time domain.

29. The apparatus of claim 15, wherein the at least one processor is further configured to cause the first sidelink device to:
receive a second cancelation indication that indicates a cancelation of a current reserved resource in the time domain or a future reserved resource in the time domain; and
transmit an additional message using a previously reserved resource that is canceled by the second cancelation indication.

* * * * *